US005985441A

United States Patent [19]

Szczepaniec et al.

[11] Patent Number: 5,985,441

[45] Date of Patent: Nov. 16, 1999

[54] LINERLESS LABEL PRODUCT, METHOD OF MAKING, APPARATUS AND METHOD FOR DISPENSING THE PRODUCT

[75] Inventors: Janusz Szczepaniec, Willow Springs; Ronald W. Rumple, Schaumburg, both of Ill.

[73] Assignee: Wallace Computer Services Inc., Hillside, Ill.

[21] Appl. No.: 09/028,534

[22] Filed: Feb. 24, 1998

Related U.S. Application Data

[62] Division of application No. 08/494,709, Jun. 26, 1995, Pat. No. 5,725,719.

[51] Int. Cl.[6] .......... B32B 7/12

[52] U.S. Cl. .......... 428/354; 428/41.8; 428/43; 428/194; 428/906; 156/354; 156/521; 83/371

[58] Field of Search .......... 428/41.8, 43, 194, 428/195, 354, 906; 156/353, 354, 517, 521; 83/371

[56] References Cited

U.S. PATENT DOCUMENTS

| | | |
|---|---|---|
| 2,818,190 | 12/1957 | Botty, Jr. . |
| 3,565,724 | 2/1971 | Yamaguchi . |
| 3,586,570 | 6/1971 | Solomon . |
| 4,425,386 | 1/1984 | Chang . |
| 4,519,868 | 5/1985 | Hoffmann . |
| 4,544,431 | 10/1985 | King . |
| 4,913,926 | 4/1990 | Rutkowski . |
| 4,985,096 | 1/1991 | Bekker-Madsen . |
| 5,024,717 | 6/1991 | Winter . |
| 5,061,947 | 10/1991 | Morrison . |
| 5,183,696 | 2/1993 | Sanderson .......... 428/194 |
| 5,279,696 | 1/1994 | Zangenfeind . |
| 5,284,689 | 2/1994 | Laurash . |
| 5,375,752 | 12/1994 | Michalovic . |
| 5,378,301 | 1/1995 | Boreali . |
| 5,547,738 | 8/1996 | Mitchell et al. .......... 428/41.6 X |
| 5,556,492 | 9/1996 | Vonderhorst . |

FOREIGN PATENT DOCUMENTS

| | | |
|---|---|---|
| 90948 | 7/1980 | Japan . |

*Primary Examiner*—Daniel Zirker

[57] ABSTRACT

A linerless label product, method of making, apparatus and method for dispensing the product wherein a convolutely wound web roll has one face coated with pressure sensitive adhesive while the other face is coated with a release material, the adhesive is interrupted in longitudinally spaced areas to provide transversely extending bands free of pressure sensitive adhesive with the web areas between bands being labels embodying alpha shapes, numeric shapes, graphics, thermally activated material and/or self-contained material; the preparation method including providing signal-stimulating means for each band and the apparatus and method of dispensing employs sensing of the signal-stimulating means to transversely sever the web in the bands.

20 Claims, 14 Drawing Sheets

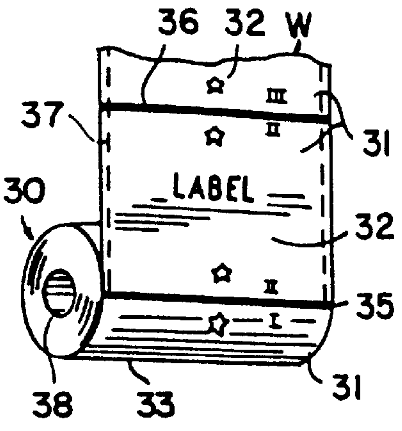
FIG. 1
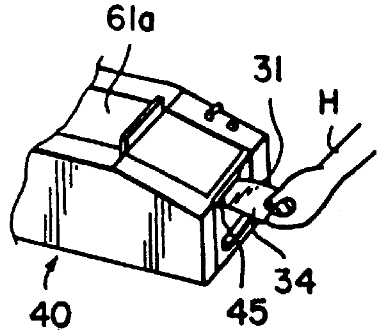
FIG. 2
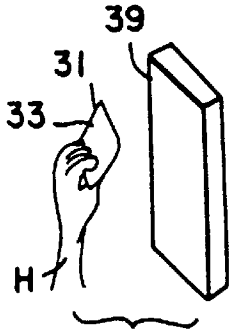
FIG. 3
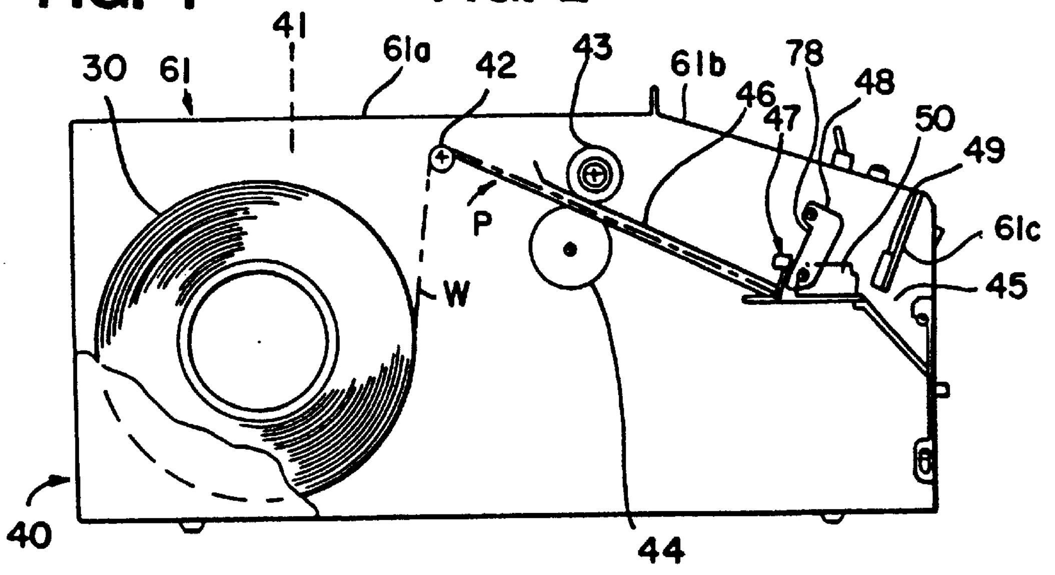
FIG. 4
FIG. 5
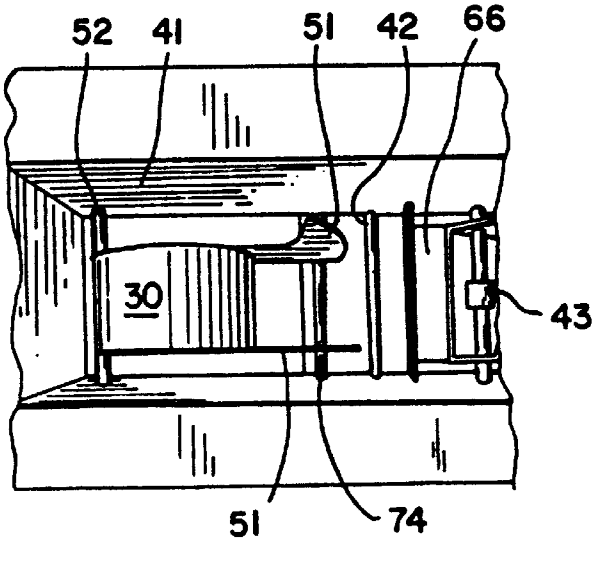

LINERLESS LABEL PRODUCT, METHOD OF MAKING, APPARATUS AND METHOD FOR DISPENSING THE PRODUCT

RELATED APPLICATION

This application is a division of our co-pending patent application entitled Linerless Label Product, Method of Making, Apparatus and Method for Dispensing the Product, Ser. No. 08/494,709, filed Jun. 26, 1995 now U.S. Pat. No. 5,725,719.

BACKGROUND AND SUMMARY OF INVENTION

This invention relates to a linerless label product, method of making, apparatus and method for dispensing the product, and more particularly, to a novel product, method of making, and method and apparatus which automatically dispenses a unitary label and without the need for manual tearing or detaching the same from a source such as a roll.

Linerless labels have been used increasingly because there is no problem of liner disposal. These represent a development stemming from the well known procedure of applying a silicone release coating to one face of a tape and a pressure sensitive adhesive to the other. But until recently this has not been widely used to provide labels, much less to provide a product and method suited for mechanical dispensing, a method therefor and apparatus to practice the method.

A dispensing approach can be found in U.S. Pat. No. 5,375,752 which requires a manual tear-off from a roll mounted on a stationary shaft and along a perforation in the label web. A second U.S. Pat. No. 5,378,301 discloses a dispenser for a string of labels in which each label overlaps one-half of a proceeding or following label. These and other prior art expedients have not provided an invention where a roll of preprinted labels are placed into a housing and then, upon demand, a separated label is proffered to an artisan for application to a receiving surface, i.e., a carton, envelope or other means suitable for identification or characterization by a label.

An advantageous feature of the invention is the linerless label product which can be provided in a convolutely wound roll for feeding through a dispenser. The web has one face coated with pressure sensitive adhesive while the other face is coated with a release material such as the widely used silicone preparations. Throughout this disclosure, we use the term "silicone" in a generic sense to refer to the various release materials that have been and can be applied to achieve a roll, for example, of pressure sensitive label material. The roll of label stock thus prepared is interrupted at longitudinally spaced areas to provide transversely extending bands free of pressure sensitive adhesive with the web areas between bands being "labels", i.e., areas carrying informational indicia which may be alpha and/or numeric shapes, graphics, thermally activated or self-contained material such as that described in co-owned U.S. Pat. No. 4,425,386. Associated with the bands are signal-stimulating means which are detectable by sensor means during the feeding of the web for activating severing means to transversely sever the web in the band area and thus deliver a completely unitary label at the outlet of the dispenser.

Other objects, advantages, and details of operation and construction of the invention can be seen in the ensuing specification.

BRIEF DESCRIPTION OF DRAWING

The invention is described in conjunction with an illustrative embodiment in which—

FIG. 1 is a fragmentary perspective view of a label roll featuring the teachings of this invention;

FIG. 2 is a fragmentary perspective view illustrating the removal of a severed label from the housing embodying the inventive apparatus;

FIG. 3 is another fragmentary perspective view illustrating the application of the label removed in FIG. 2 and being applied to a receiving surface;

FIG. 4 is a side elevational view somewhat simplified of the inventive apparatus seen fragmentarily in FIG. 2;

FIG. 5 is a fragmentary top perspective view of the left hand portion of the apparatus of FIG. 4;

DETAILED DESCRIPTION

Figure 6:
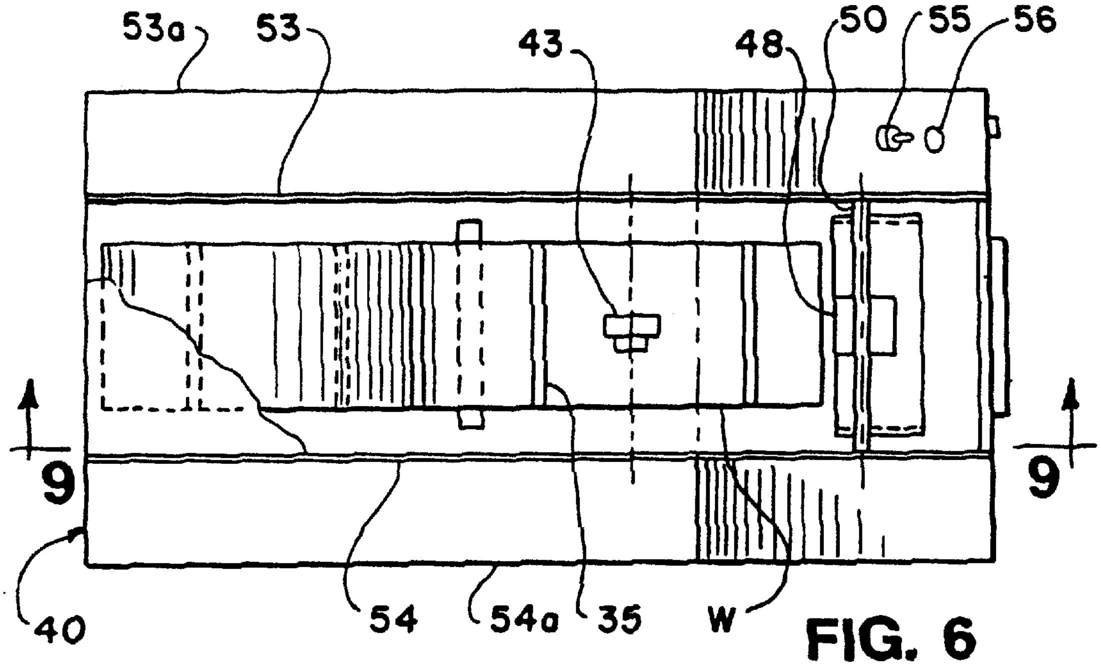
FIG. 6 is a top plan view of the housing of FIG. 2.

In the illustration given and with reference first to FIG. 1, the numeral 30 designates generally a roll of linerless label stock. The roll is convolutely wound and includes a plurality of labels 31 in longitudinally spaced apart relation on the continuous, elongated web W which constitutes the linerless label. Each label 31 is equipped with indicia 32 which may be printing and advantageously applied prior to the convolute winding of the roll. As indicated previously, the indicia 32 may be printing in the form of alpha, numeric and/or graphic shapes—or it may be areas of material adapted to receive information such as thermally-activated or self-contained material. By self-contained, we refer to such material as those containing CF and CB components as found in the previously referred to co-owned U.S. Pat. No. 4,425,386.

Linerless labels have one face which is silicone coated, this being the face 33 on which the printing normally occurs. The reverse face is coated with the pressure sensitive adhesive 34 and this can be appreciated from a consideration of FIG. 2 where the label 31 issuing from the apparatus has the adhesive side positioned uppermost and grasped by a hand H. This is advantageous for a number of reasons to be described in further detail hereinafter after further details of the method and apparatus have been brought out.

Returning again to FIG. 1, the numeral 35 refers to an adhesive-free band or skipped portion which, in the illustration given, is equipped with dark material 36 so as to be essentially non-reflective. In contrast, the surface of the label 31 between the bands 35 is advantageously white or "light" in the illustration given so as to be substantially reflective. The numeral 37 designates the margin of the pressure sensitive adhesive which need not extend to the edge—and thereby prevent leakage or seepage of the adhesive. This could result in undesirable affixing of the label web to materials other than those intended.

Further, in the illustration given, the roll 30 has an axial opening 38 which contains a paperboard core. However, since the dispenser does not utilize a shaft for the core, any size core can be used, depending upon the particular winder and, for that matter, with certain types of winders the core itself may be omitted.

Now referring to FIG. 3, it will be seen that the label 31 with the silicone side 33 facing the reader is held by the hand H and is in the process of being applied to an object 39 to be labeled. We have found that one of the advantages of operating the apparatus with the adhesive side of the linerless label positioned upwardly, is the elimination of awkward and sometimes painful rotating motions of the artisan's hand incident to removing the label and applying the same to the object 39. Moreover, it is easier to grasp a glue-equipped sheet with the thumb facing the glue—so that application as seen in FIG. 3 requires only the detachment of the artisan's thumb—while the other four fingers press the label 31 against the object 39.

The printing on the label, if present, may be fixed, variable or both. By fixed, we refer to the same information or message on each of the labels—as, for example, the name of the product, name and address of manufacturer, etc. This is indicated by the "stars", i.e., "graphics" in FIG. 1. The variable information can change from label to label or at least between some labels. This is indicated by the different numeric information on each of the labels in FIG. 1, viz., I, II and III.

Method of Making

Figure 14:
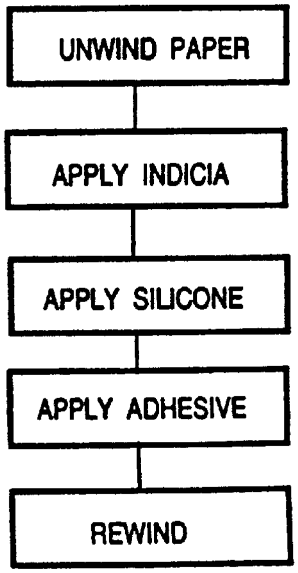
FIG. 14 is a schematic diagram of steps involved in the method of making the label roll.

The roll 30 is advantageously made by the steps set forth in the block diagram of FIG. 14. The illustrated method starts with providing a source of paper such as 60# All Purpose Litho available from Champion Paper Co. located in Hamilton, Ohio. Since the ultimate product is provided in roll form, we prefer to start with a parent roll. This is unwound in the step UNWIND PAPER in a conventional unwind and the web is advanced through the usual draw rolls into a printer designated APPLY INDICIA.

Excellent results are obtained with a flexographic printer although other conventional printers may be employed to apply to a first face of the paper web the means for signal stimulation, viz., the blackened band 36. On the second or obverse face we apply whatever information is required by the customer, viz., product identification, shipping information, etc. The two coatings may be applied simultaneously. Where the label indicia is to be provided through self-contained material, the act of "imprinting" may be deferred until just before label application as shown in FIG. 3.

The coating 36 of the bands 35 may be a black ink obtained under product designation Water Litho Jet Black WLL004145 from Water Ink Technologies located in Iron Station, N.C. A suitable weight application is from 0.05 to 0.20 lbs/ream of 1300 sq. ft. with 0.10 lbs/ream being utilized in the illustrated embodiment. Other suitable inks may also be employed if reflectivity-type sensors are used. If different sensing means are employed, the signal-stimulation indicia may be other than bands but we find bands perform excellently as the guide means for transverse severing. This same ink may be employed for the printed indicia 32 in the illustration given.

After the ink applications the web is advanced to and through a coater to APPLY SILICONE to the first face, i.e., the face on which the label indicia has been applied. A suitable silicone material is Type 9300 available from General Electric located in Waterford, N.Y. and a range of coating weights may be employed such as from about 0.10 to about 1.00 lbs/ream of 1300 sq. ft. with 0.4 lbs/ream being utilized in the example illustrated.

Thereafter, the once coated web is advanced to and through a second coater for the step APPLY ADHESIVE:, i.e., the application of pressure sensitive adhesive to the second face between the spaced bands 35. This avoids adhesive build-up on the transverse cutting means which we prefer to operate about midway of the bands 35. As suitable product for this purpose is product No. DURO-TAK 34-4144 available from National Starch and Chemical Co. located in Bridgewater, N.J. About 1.0 to about 10.0 lbs/ream of 1300 sq. ft. is applied with 6 lbs/ream being utilized herein. After the adhesive coating, the web is rewound into retail-sized rolls as indicated by the step REWIND.

In some instances, it may be desirable or advantageous to alter the sequence of steps described in connection with FIG. 14. For example, the printing could be on the face under the pressure sensitive adhesive, if the label is to be placed on the inside of a glass window.

Thus, the method of making a linerless label includes the steps of advancing an elongated paper web along a predetermined path, applying indicia such as printing to a face of the web in longitudinally spaced positions while applying, as by printing, a signal-stimulating means to the web between those positions, applying a release material to the web, thereafter applying pressure sensitive adhesive to the web at least in the aforesaid positions, and thereafter winding the web on itself. Optimally, the signal-stimulating means includes applying black ink in an amount of about 0.10 lbs. per ream of 1300 sq. ft. and which has a dimension in the direction of web length of about ⅛" (3 mm.) to about ½" (13 mm.).

Apparatus—Generally

Referring now to FIG. 4, the numeral 30 again designates the roll of linerless label material which is seen to be positioned within the housing generally designated 40. More particularly, the roll 30 is deposited loosely within a chamber 41 of the housing 40 (see the left central portion of FIG. 5).

Returning to FIG. 4, the symbol W is applied to the web being unwound from the roll 30 to proceed along a predetermined path P over an idler roller 42. The force to advance the web along the path P is applied by draw rollers 43, 44—see the central upper portion of FIG. 4. Both of these rollers are journalled suitably within the housing 40 which provides a frame for supporting the various elements in predetermined relationship. The rollers 43 and 44 coact to advance the web W along a predetermined path P from the roll 30 to an outlet 45 provided at the extreme right hand end of the housing 40. Inasmuch as the roller 43 contacts the adhesive side of the web, it is advantageously coated with TEFLON or similar material.

This path P is defined in part by a label guide 46 (still referring to the upper central part of FIG. 4) where the web is directed toward and into contact with knife means generally designated 47. The knife means 47 is actuated by a signal from a sensor assembly generally designated 48. This senses the indicia 36 which we term generally cue marks to embrace a variety of signal-stimulating means. This senses the presence of one of the darkened bands 36, viz., a cue mark or indicia, so as to cause a transverse severance of the web W.

In the illustration given, we provide a second sensor at 49 which detects the presence or absence of a label in the label holder assembly 50. Thus, if a label is present, the signal from the sensor assembly 48 is inhibited and no advance or severance can occur until the label is removed—thus automatically avoiding any jam condition.

As indicated previously, the left hand portion of FIG. 4 is seen in fragmentary perspective in FIG. 5. This view shows the roll 30 provided in the roll chamber 41 where the roll 30 is confined by guides 51 which are positioned within slots of a cross member 52. This accommodates the apparatus to different width rolls. The positionable guides 51 can also be seen in FIG. 9.

Housing—Details

Reference is now made to FIG. 6 where the housing 40 is seen in top plan view. The housing includes a pair of sidewalls as at 53 and 54 which are covered by suitable covers or guards 53*a* and 54*a*, respectively. In both FIGS. 6 and 7, the numeral 55 designates a feed mode selector switch while the numeral 56 designates the feed label switch for the "manual" mode. The numeral 57 (see FIG. 7) designates the power off-on switch while the numeral 58 designates a pilot light that also is a warning light for checking the system for faults—to be described hereinafter in connection with the inventive software. The numeral 59 designates a fuse carrier. Still referring to FIG. 7, the numeral 45 again designates the outlet for a label—see also FIGS. 2 and 4.

Figure 8:
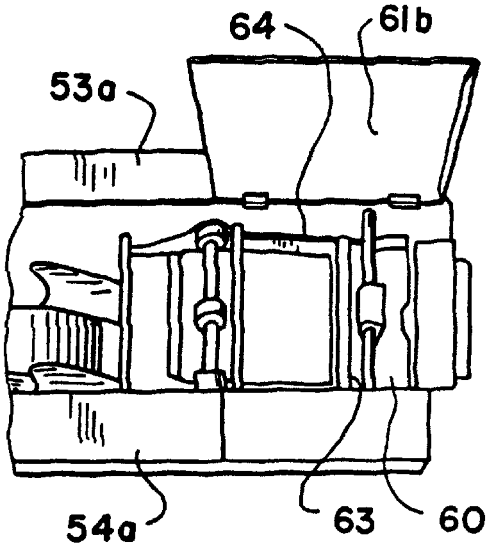
FIG. 8 is a fragmentary top plan view of the left hand end of the apparatus housing of FIG. 6 but with the top closure wall removed.

A portion of the right side cover 53*a* has been employed as the support for the electronics portion of the inventive apparatus. In some measure, the housing or chassis is of the prior art type for dispensing gummed tape—in which case a compartment 60 (see FIG. 8) was used for glue activation, i.e., wetting, heating, etc. A suitable prior art tape dispenser is that of Model 755 of Better Packages of Shelton, Conn. 06484. The prior art dispenser included substantially all of the elements up through the knife means 47 as well as a portion of the top closure means 61. This included a hinged panel 61*a* over the roll compartment. A knife portion cover 61*b* has been constructed according to the instant invention—see FIG. 4.

Housing—Internal Details

Figure 9:
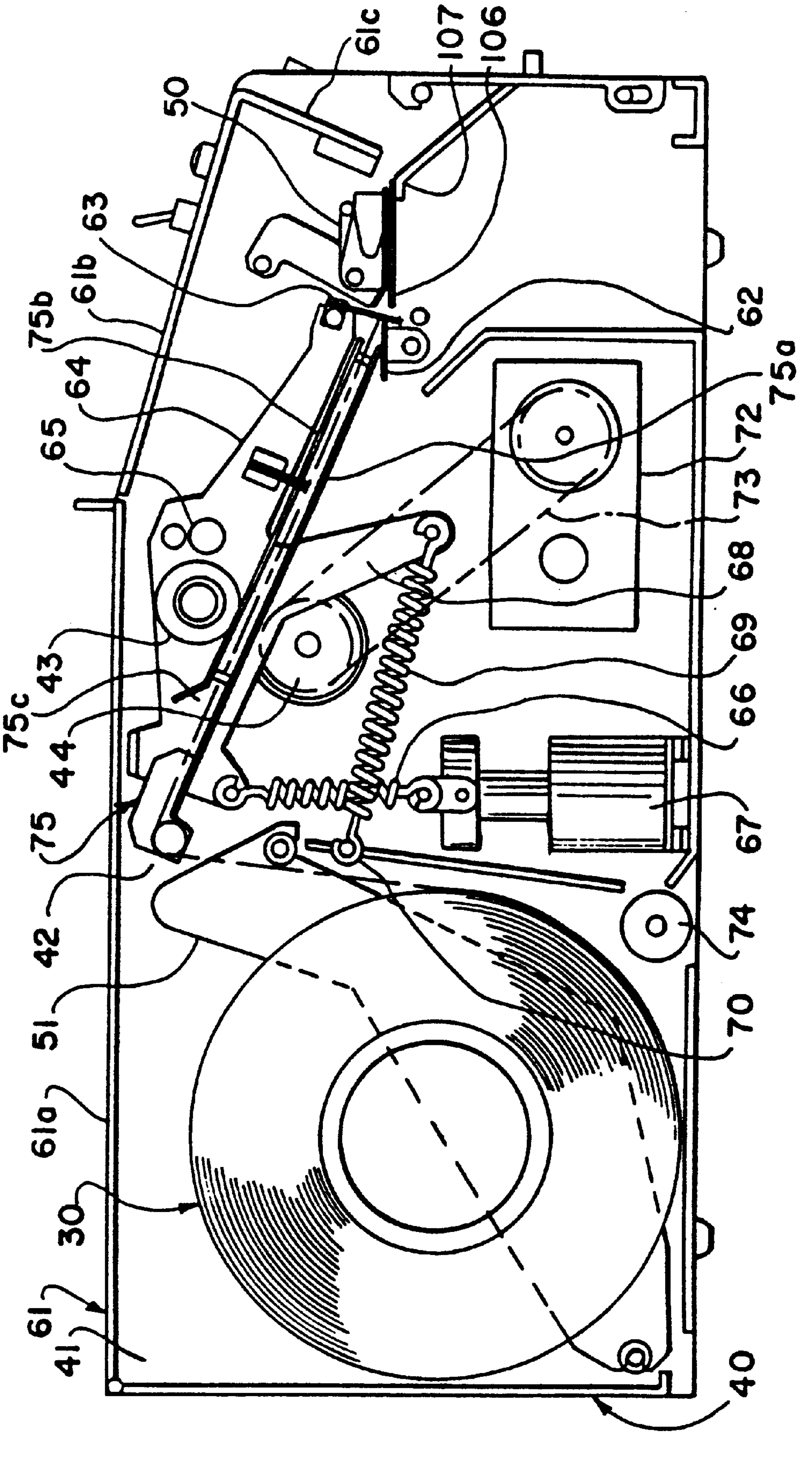
FIG. 9 is a more detailed view of the showing of FIG. 4, being a side elevational view of the apparatus such as would be seen along the sight line 9—9 of FIG. 6.

Reference is now made to FIG. 9 on the third drawing sheet where the numeral 62 designates a spring loaded, pivotally mounted lower knife of the assembly 47. In the illustration given, the upper knife 63 is the movable part of the transverse severing means.

Figure 10:
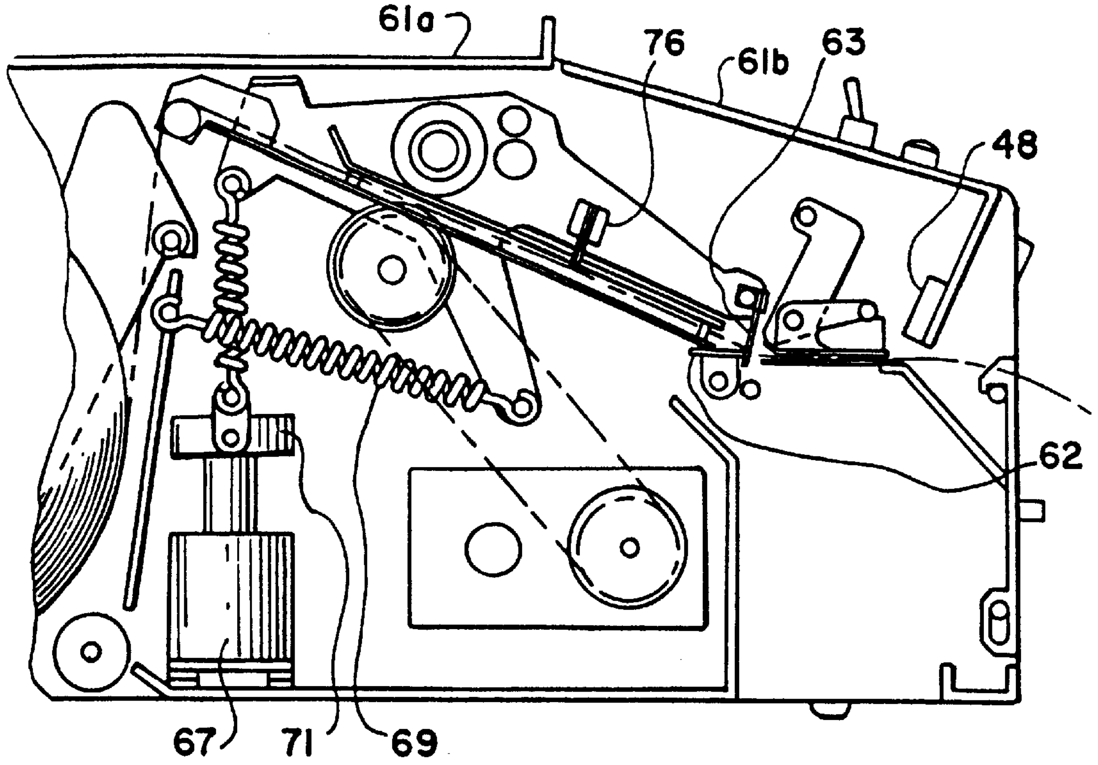
FIG. 10 is a fragmentary view of the central portion of FIG. 9 and showing the apparatus in a "cutting" mode.

Still referring to FIG. 9, the numeral 64 designates an actuator arm assembly which is pivotally mounted on the housing by virtue of a cross shaft 65. At its downstream end, i.e., to the right in FIG. 9, the arm assembly 64 carries the movable or upper knife 63 which cooperates with the knife 62. At its upstream or left end, the arm assembly 64 is connected via a coiled spring and linkages 66 to a solenoid 67 fixed to the housing 40. The arm assembly 64 also has a depending portion as at 68 which is spring-loaded as at 69 to the housing or frame as at 70. Thus, when a signal to cut de-energizes the solenoid, the situation depicted in FIG. 10 occurs. The solenoid armature 71 is raised and the tension spring 69 pulls the upper knife 63 into engagement with the lower knife 62.

Figure 11:
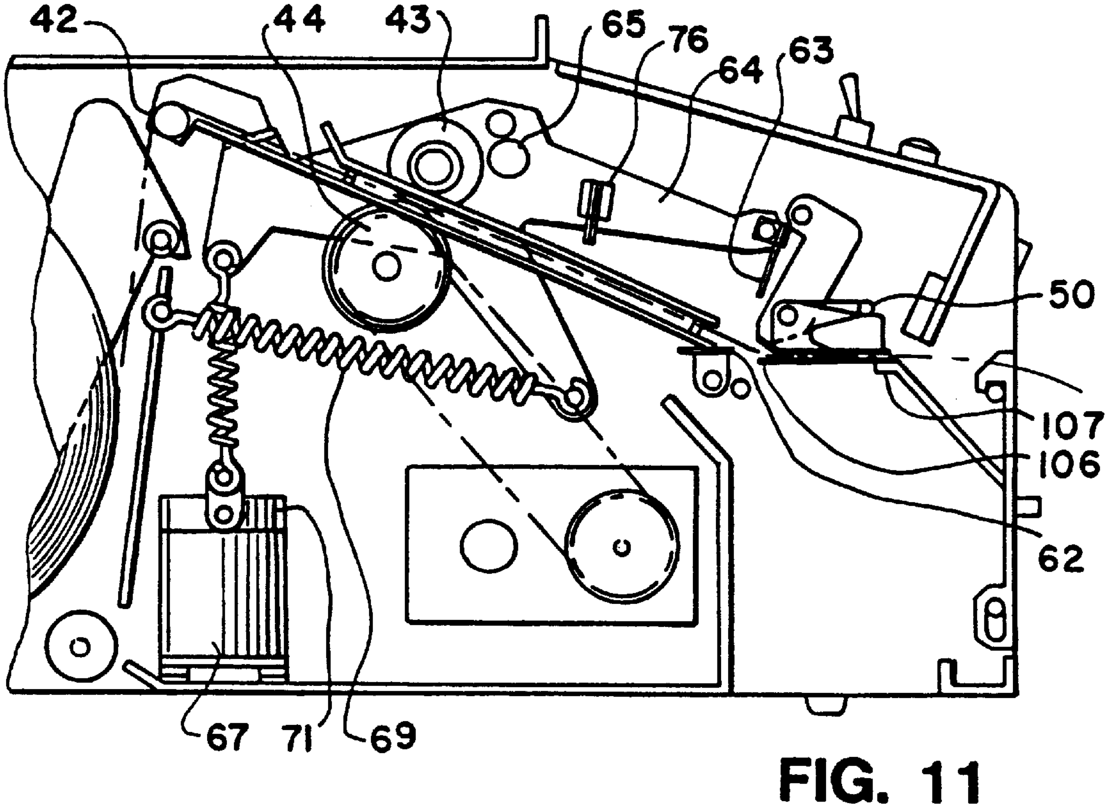
FIG. 11 is a view similar to FIG. 10 but showing the apparatus in its "feeding" mode.

Then, when the snap cutting is completed, and another label is to be fed, the situation depicted in FIG. 11 occurs. There, the solenoid 67 is re-energized to retract the armature and rotate the arm assembly 64 slightly counterclockwise around the pivot 65. This raises the upper knife 63 away from the lower knife 64 and simultaneously brings the nip or idling roller 43 into nipping engagement with the feed roller 44—thereby again advancing the web W.

The advancing of the web W is achieved through a motor assembly 72 (see the lower central portion of FIG. 9) which operates through a drive 73 to rotate the draw or pull roll arrangement 43, 44 for advancing the web.

As mentioned previously, confining the label roll 30 are a pair of positionable guides 51 (see also FIG. 5). Also provided is a lower idler roller 74 (see the lower portion of FIG. 9 and the central portion of FIG. 5) against which the roll 30 can bear if needed. As the web is unwound from the roll 30, it passes around the first idler roller 42 carried by the housing 40 and with the siliconed side of the web in contact with this idler roller 42. Extending downstream from the idler roller 42 is the web guide generally designated 75 (see FIG. 9 in the upper center). The guide 75 includes a lower guide 75*a* and an upper guide 75*b*. Where these two elements start, they define a throat 75*c* for the threadable receipt of the leading edge of a web when a new roll 30 is introduced into the roll compartment 41.

In the prior art dispenser, an actuator button was provided which, when held down, actuated the motor assembly 72 to advance the gummed web and to energize the solenoid 67. This raised the upper knife 63 and advanced the gummed label web. When sufficient gummed label had been dispensed, the button was released—which simultaneously cut the web and stopped the advance. Differing from this prior art in the instant invention is a web retainer 76 on the arm assembly 64—compare the central portions of FIGS. 10 and 11.

The web hold down finger or retainer 76 is especially advantageous in preventing inadvertent retraction of the web incident to cutting. For example, when the web is advanced by the rollers 43, 44, there is a tendency to raise the roll 30 within the compartment 41. This results from the resistance of the adhesive side to part from the silicone side. Then, when the advancing is stopped by virtue of the pivoting of the arm assembly 64, there is a tendency for the roll 30 to drop downwardly into position against the bottom of the dispensing housing. This then could result in the cut web retracting too far from draw rollers 43, 44 to contact it to feed the next label. However, the provision of the web retainer 76 prevents this from happening because as the arm moves the knife or downstream end downwardly it also moves the web retainer 76 downwardly and this retains the web against inadvertent retraction.

The foregoing detailed description of the prior art tape dispenser is made to disclose our present embodiment but it will be appreciated that other mechanisms can be employed for delivering and cutting our novel linerless label web where the mechanism is responsive to a signal from the web itself. For example, a teaching of a web stimulated signal is U.S. Pat. No. 5,061,947 which provides a label having a conventional liner. It should be appreciated however, that other combinations of elements than those of the prior art gummed tape dispenser may be used for (1) housing the roll, (2) advancing a web from the roll, (3) severing the web at longitudinally-spaced, transversely extending lines, and (4) deactivating the advancing means during the transverse severing.

Figure 12:
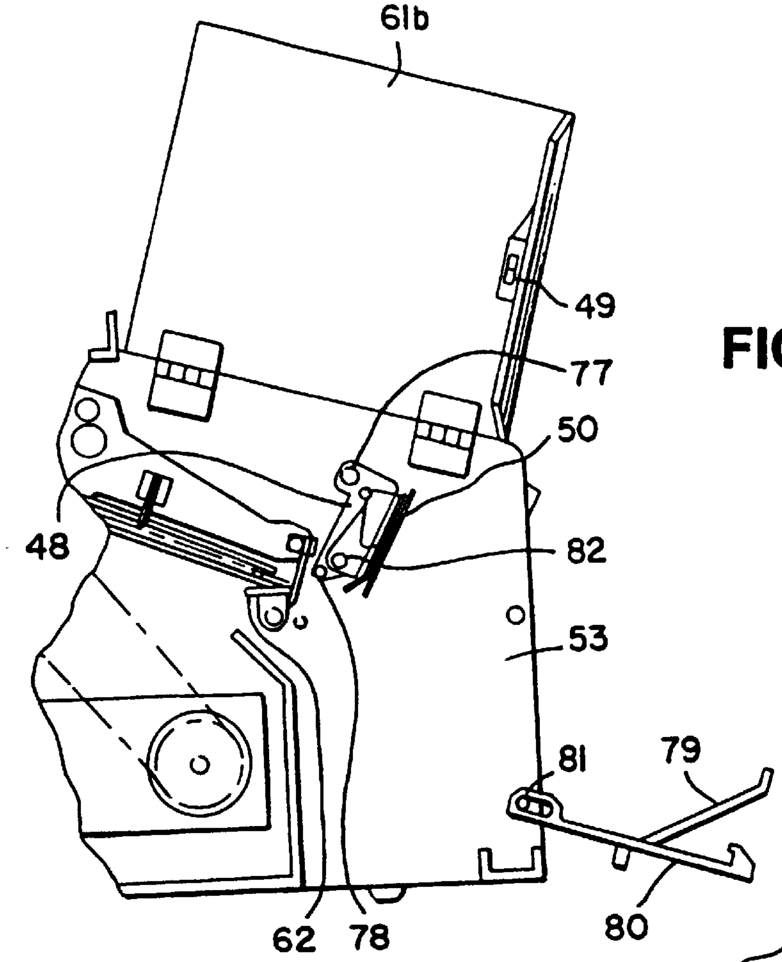
FIG. 12 is a fragmentary view similar to FIG. 11 but on slightly lesser scale and shows the cover plate pivoted open so as to permit cleaning of the two sensors.
Figure 13:
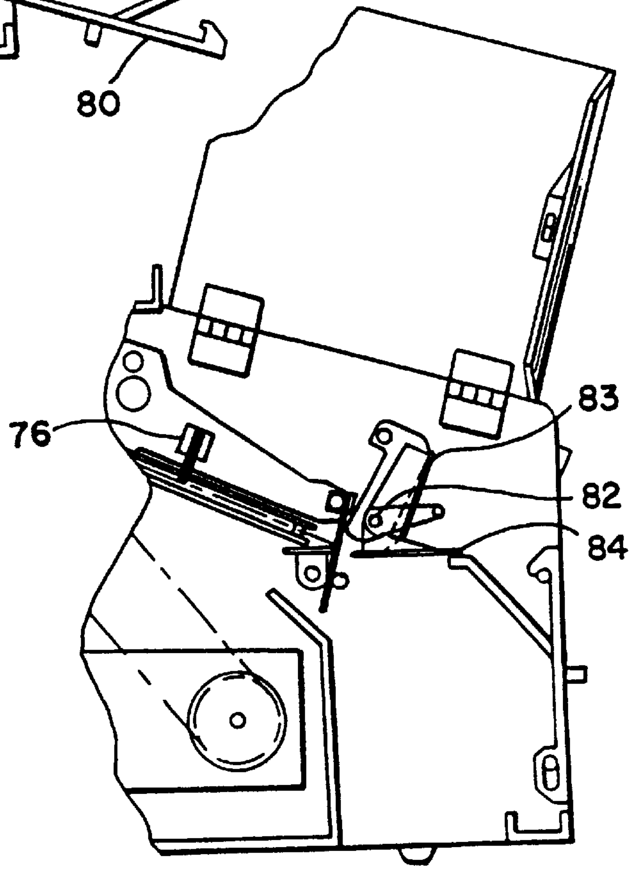
FIG. 13 is a view similar to FIG. 12 but featuring the discharge guide means which also can be cleaned by virtue of opening the top wall.

Reference is now made to FIGS. 12–13. Here we show in the right hand portion the elements we have substituted for those of the prior art gummed tape dispenser. The newly-provided elements include in addition to the retainer 76 and knife cover 61*b*, the band or cue mark sensor assembly 48 which is supported on the sidewalls 53, 54 by fasteners 77. The assembly 48 includes the sensor itself which is designated 78—see FIG. 12. A suitable device is product designation QRB1113/1114 available from DIGI-KEY Corp., located at Thief River Falls, Minn. 56701. The sensor 78 is positioned close to the knife assembly 47 so as to sense a band 36 as soon as it is positioned above the lower knife 62. At this time, the upper knife 63 has been previously pivoted to its upward position as seen in FIG. 11. When band sensing occurs, the arm assembly 64 is pivoted to the condition of FIG. 10 where the upper knife 63 moves downwardly to engage the lower knife 62 and to sever the web. This occurs quickly. But because there is a discrete response time and because of other variables in the apparatus and product, viz., web tension, we provide the band of suitable "width", i.e., the dimension in the direction of web advance, of the order of about ⅛" to about ½". Normally, the term "width" when applied to the web W refers to the transverse dimension, i.e., perpendicular to the length of the elongated web. But where the bands are quite narrow in comparison with their dimension across the web, we refer to this band thickness as the band "width".

The pivoting of the arm assembly 64 to initiate cutting simultaneously removes the upper idler roller 43 from nip-providing relationship with the lower feed roller 44—thereby stopping advance of the web and while retraction is prevented by the retainer 76.

The severing of the web results in a detached web portion or label 34—as previously described in conjunction with FIG. 2. At this time, the label is supported in a holder assembly 50 which is pivotally mounted on the sensor assembly 48. Cooperating in supporting the holder assembly 50 is a cross member 79. As can be appreciated from a comparison of FIGS. 12 and 13, the member 79 is supported on the lower end wall 80. This end wall is itself pivotally mounted as at 81 on the sidewalls 53, 54. By pivoting the knife cover 61*b* to the position shown in FIG. 12, it is also possible to pivot the holder assembly 50 to its FIG. 12 position. Then, when the end wall 80 is opened, the cross member 79 is pivoted to its FIG. 12 showing—and this exposes the lower face of the sensor 78 for cleaning. It will be appreciated that any web cutting is accompanied by fine dust particles, which can lodge anywhere and possibly affect the operation of the sensor 78. However, by positioning the sensor above the web, gravity deposition of dust particles thereon is minimized. This advantage stems from having the adhesive side of the web uppermost—this usually determining where the bands 35 are found.

The pivoting upwardly of the top wall 61*b* also carries the second sensor 49 upwardly as well—and exposes the lower face of the sensor 49 for cleaning—as can be readily appreciated from FIGS. 12 and 13.

The label holder assembly 50 includes a cross shaft 82 which carries an upper plate 83. This upper plate has a lower face that is equipped with release material such as an aluminum flame spray impregnated with silicone. The lower surface of upper guide 75*b* (FIG. 9) is equipped with release material as well. In keeping with this we also equip the rollers 43 and retainer 76 with a Teflon coating because these also come in limited contact with the adhesive-equipped top surface of the web W.

The holder assembly 50 via the cross shaft 82 also supports a lower plate 84 (see FIG. 13)—spaced suitably from the upper plate 83 to permit easy passage of the severed label 34. The lower plate 84 may be equipped with a Teflon upper surface, viz., that surface supporting the label 34.

It will be noted that the second sensor 49 is spaced "downstream" from the first sensor 48—which permits sensing the presence of a label in the holder 50. When this sensing occurs, it is not possible to actuate either the advancing or the cutting mechanism.

We now discuss the novel electronics provided to convert the prior art gummed label dispenser to one for linerless labels.

Electronic Circuitry

Figure 15:
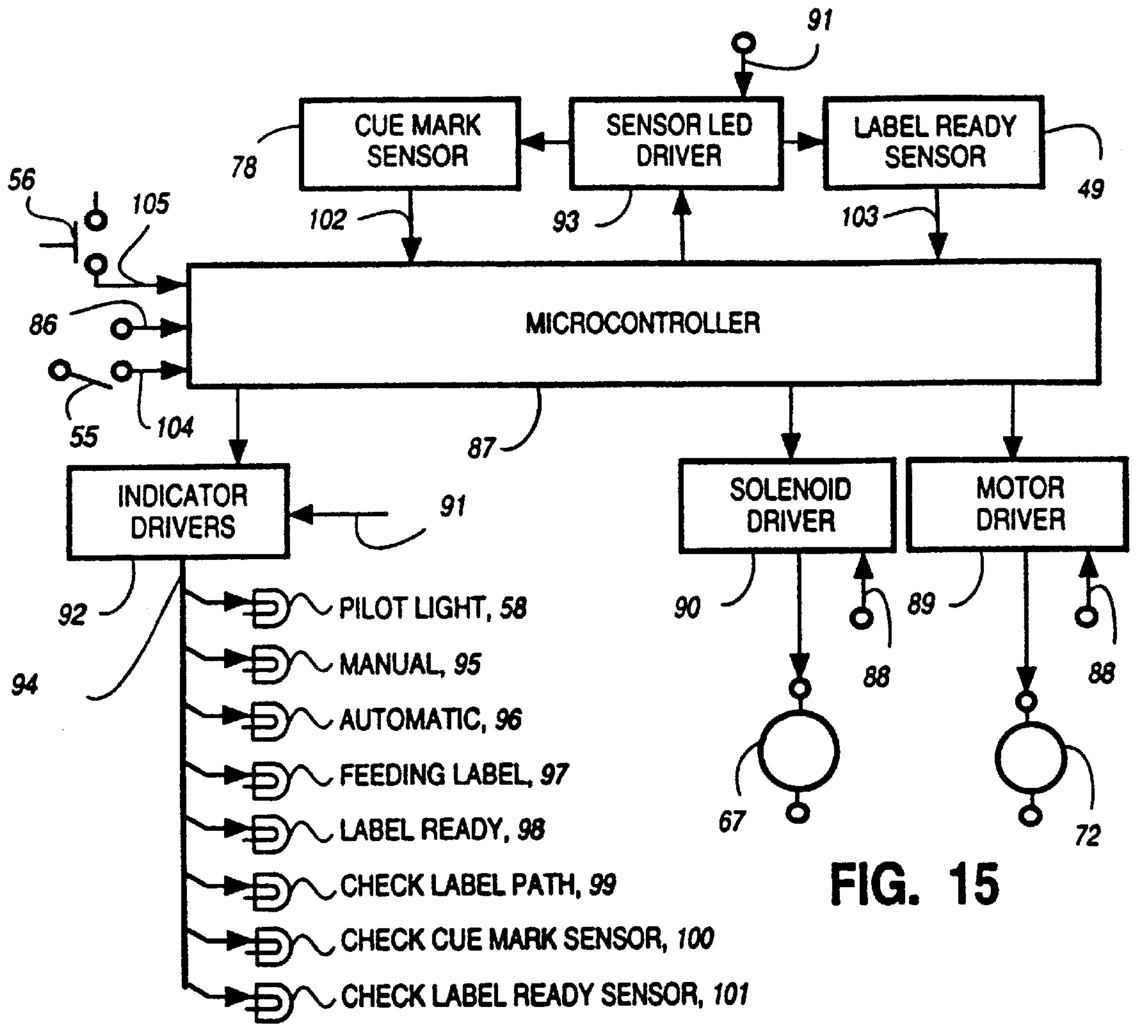
FIG. 15 is a block diagram of the electronic circuitry associated with the dispenser of FIG. 4.
Figure 16:
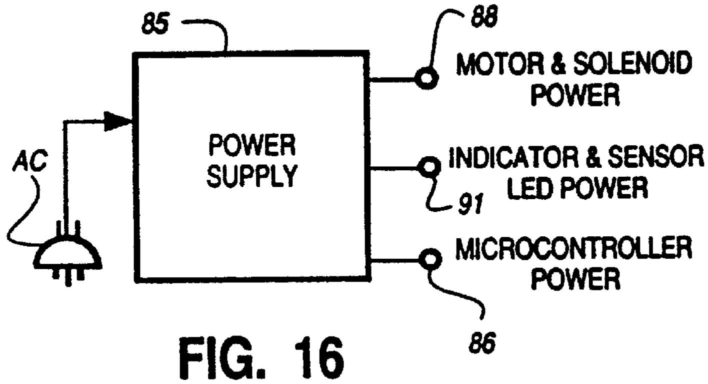
FIG. 16 is a diagram of the power supply associated with FIG. 15.

FIG. 16 is a diagram of the power supply for the block diagram of circuitry of FIG. 15. Referring now to FIG. 16, the symbol AC designates the plug for connection to a source of conventional power such as the usual 110–115 volt, 60 cycle current conventionally available. This is delivered to the power supply block 85 which contains, among other things, a transformer, voltage regulator, rectifier, filter capacitor, etc. The output of the power supply is delivered along line 86 to the microcontroller 87.

Power is also delivered along the line 88 to the motor driver 89 which is associated with the microcontroller 87 and which connects the microcontroller 87 with the drive motor 72. In some cases, the motor supply is unchanged from the line voltage. Advantageously, the drive motor 72 is a low speed, high torque gear motor. The motor driver 89 is an opto-coupled triac.

The output 88 also powers the solenoid driver 90 which is the same type of triac as the motor driver 89. The solenoid driver thus couples the micro controller 87 with the drive solenoid 67.

Referring again to FIG. 16, the numeral 91 indicates another output from the power supply 85 which is coupled to the indicator drivers indicated at 92 and also to the sensor light emitting diode driver 93. The numeral 94 designates the line connecting the indicator drivers 92 to the various lights to be described hereafter. In some installations, the sensor LED driver may be a red driver so as to function with a green cue mark 36—or a yellow driver with a black cue mark—or just as long as there is a difference between colors or reflectivities sensed. For example, if the adhesive is more opaque—or tinted—the band could be the plain white.

The power from the indicator drivers 92 is delivered via line 94 to eight different indicating devices in the illustrated embodiment. These devices include the pilot light 58, the manual light 95, the automatic light 96, the feeding label light 97, the label ready light 98, the check label path light 99, the check cue mark sensor light 100 and the check label ready sensor 101.

These lights give signals to the operator and, for example, indicates that the apparatus is available for operation when the pilot light 58 is lit. Then, one of the lights 95 for manual and 96 for automatic should be on indicating which mode has been selected for operation. When the apparatus is actually feeding a label, i.e., prior to stopping and cutting, the light 97 will be on. Then, when the label has been cut and is available for manual withdrawal or the like, the label ready light 98 will be on and the feeding label 97 is off.

The last three indicator lights 99–101 alert the operator to problems within the dispenser. As illustrated, the check label path light 99 tells the operator that for some reason the label is unable to feed properly through the apparatus. The illumination of the cue mark sensor light 100 indicates that this particular sensor is not operating the way it should and therefore should be checked. The same rationale applies to the label ready sensor light 101 which, if on, signals the operator that something has to be checked relative to the label ready sensor 49.

As pointed out previously, the output 91 not only was coupled to the indicator drivers 92 but also to the sensor LED driver 93. This in turn is coupled to the two sensors 78, 49 previously referred to. The cue mark sensor 78 is provided as part of the assembly 48 to ensure stability by its stabilized mounting within the apparatus and connection to the opposed sidewalls 53, 54. The label ready sensor 49 is supported as shown in FIG. 4 on the depending flange portion 61*c* of the downstream top wall 61*b*. Each of the sensors 78, 49 is coupled to the microcontroller 87 to provide input thereto as by the line 102 for the cue mark sensor 78 and line 103 for the label ready sensor 49.

Figure 7:
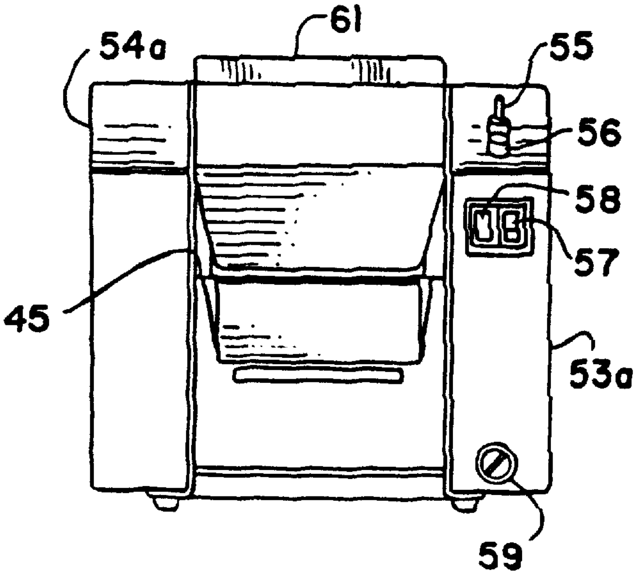
FIG. 7 is an end elevational view of the discharge end of the apparatus housing of FIG. 6 and which would be seen looking from the right hand side of FIG. 6.

Also providing input to the microcontroller 87 is the feed mode selector switch 55 previously identified with respect to FIGS. 6 and 7. This is provided along the line 104 and the line 105 couples the feed label switch 56 to the micro controller 87 and which is used for the "manual" mode.

Operation of Sensor LED Driver

We will now describe the operation of the sensor LED driver 93, the associated cue mark sensor 78, the microcontroller 87 and the advancing means by including the feed and idler rollers, motor and drive, etc. not only during startup of the apparatus but each time the web is advanced to provide a new label.

When there is no web below the cue mark sensor 78, full power is delivered from the driver 93 to the two sensors 78, 49. If this is the instance where a label has just been cut, the severed label 34 is impelled somewhat downstream due to the energy of the severing knives, particularly the upper knife 63. This energy directs the severed label 34 a distance sufficiently downstream so as not to any longer be sensed by the cue mark sensor 78.

In this condition, as just mentioned, the driver 93 delivers full power to the two sensors 78, 49. Until the label 34 is removed and this removal sensed by the label ready sensor 49, the advancing means does not operate. This is attended by the illumination of the label ready light 98 which stays on until the label 34 is removed.

Then, when the label 34 is removed from the output 45, the apparatus is in condition for feeding. This is brought about by the energization of the drive motor 72 and the drive solenoid 67 which advances the web while pivoting the arm assembly 64 counterclockwise. When this occurs, the driver 93 is set to full power and the microcontroller 87 is sensitized for looking at the cue mark sensor 78 via line 102. When the cue mark sensor 78 detects the leading edge of the now-being advanced web, the microcontroller 87 upon receipt of this signal reduces the power input to the driver 93 to minimum. Thereafter the microcontroller 87 operates in a loop elevating the power level to the driver 93 until there is a signal received via line 102 from the cue mark sensor 78 indicating the presence of the web underneath the sensor 78. Here it will be appreciated that this may vary from roll to roll dependent upon the character of the web, printing, etc. because this sensor 78 is responding to the section of the web which is printed and may have different degrees of reflectivity going from roll to roll. As illustrated, the sensor is actuated by the signal reflected from the pressure sensitive adhesive equipped face of the web. In other words, the microcontroller-driver-sensor combination is calibrating itself to the section of the web 31 between the adhesive-free bands 35 and, in the illustration given, the bands which are covered by the ink 36.

Thereafter, the microcontroller 87 operates in a waiting mode until the sensor 78 senses the next band 36. During this waiting period, the level of power delivered from the driver 93 to the sensors 78, 49 is maintained at the calibrated level. As mentioned previously, this sequence takes place every time a label is fed—not only on the initial setup.

Now, when the sensor 78 detects the presence of a band 36, a signal is delivered to the microcontroller 87 which stops current being delivered to the solenoid driver 90 and which in turn releases the armature 71 of the solenoid 67, thereby effecting a cut. In the automatic mode, there is no cessation of power being delivered by the microcontroller 87 to the motor driver 89 because the motor 72 can continue to operate the drive roller 44 because it does not engage the nip-providing roller 43. Therefore, the motor 72 does not advance the web W and this avoids the need for starting and stopping the motor 72. Also provided is a timer so that if the label 34 is not removed from the outlet 45 within a matter of a few seconds, the power to the motor driver 89 is removed until the label 34 is removed.

The foregoing operational sequence details the calibration/recalibration of the electronics portion of the system because each time a label is fed, the same considerations are utilized by the microcontroller in its regulation of power to the sensor LED driver. So, if there are different labels in the same roll, there might be different levels of power delivered at different times to the sensor LED driver 93 and even further and, more normally, as the sensors become coated with dust, this recalibration is especially advantageous in regulating the level of power to the driver 93 and thus to the sensors 78, 49.

Other factors which are compensated for by the calibration/recalibration advantage of the invention include the following: first, there can be a degree of temperature sensitivity in any given sensor. Second, sensors may vary in their own sensitivity going from one sensor to another as being placed in different machines. Thirdly, the actual placement of the sensor in the machine may be different in one machine to another which also would impact upon the sensitivity.

The sensors in the illustrated embodiment are directed at areas of minimal reflectivity to approximate the reflectivity that results from nothing being in the web path. In the illustration given, this minimal reflectivity is achieved by virtue of providing an opening 106 in the label holder assembly 50 under the sensor 78 (see the right central portion of FIG. 9). Still referring to FIG. 9, the sensor 49 is supported on the depending flange 61*c* portion of the forward upper wall 61*b*. Immediately below that, there are openings 107 provided in the extreme downstream portion of the label holder assembly 50. It will be appreciated that these openings may be omitted if the surfaces confronting the sensing ends of the sensor are coated to provide little or no reflectivity.

Microcontroller Software

Figure 17A:
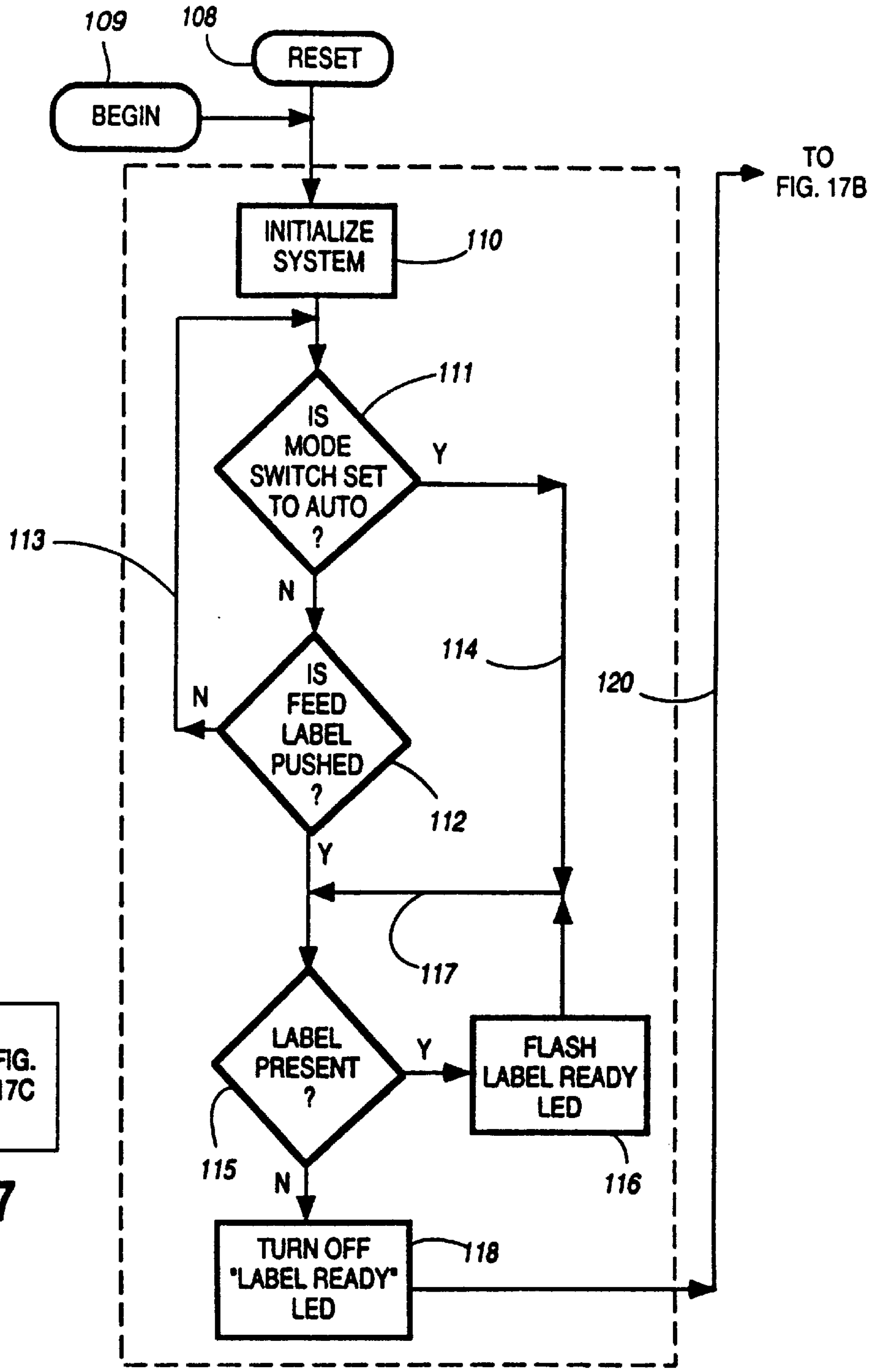
FIG. 17 is a logical flow diagram relating to the microcontroller software and consisting of interconnected portions 17A, 17B and 17C.
Figure 17:
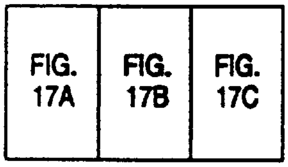
Figure 17B:
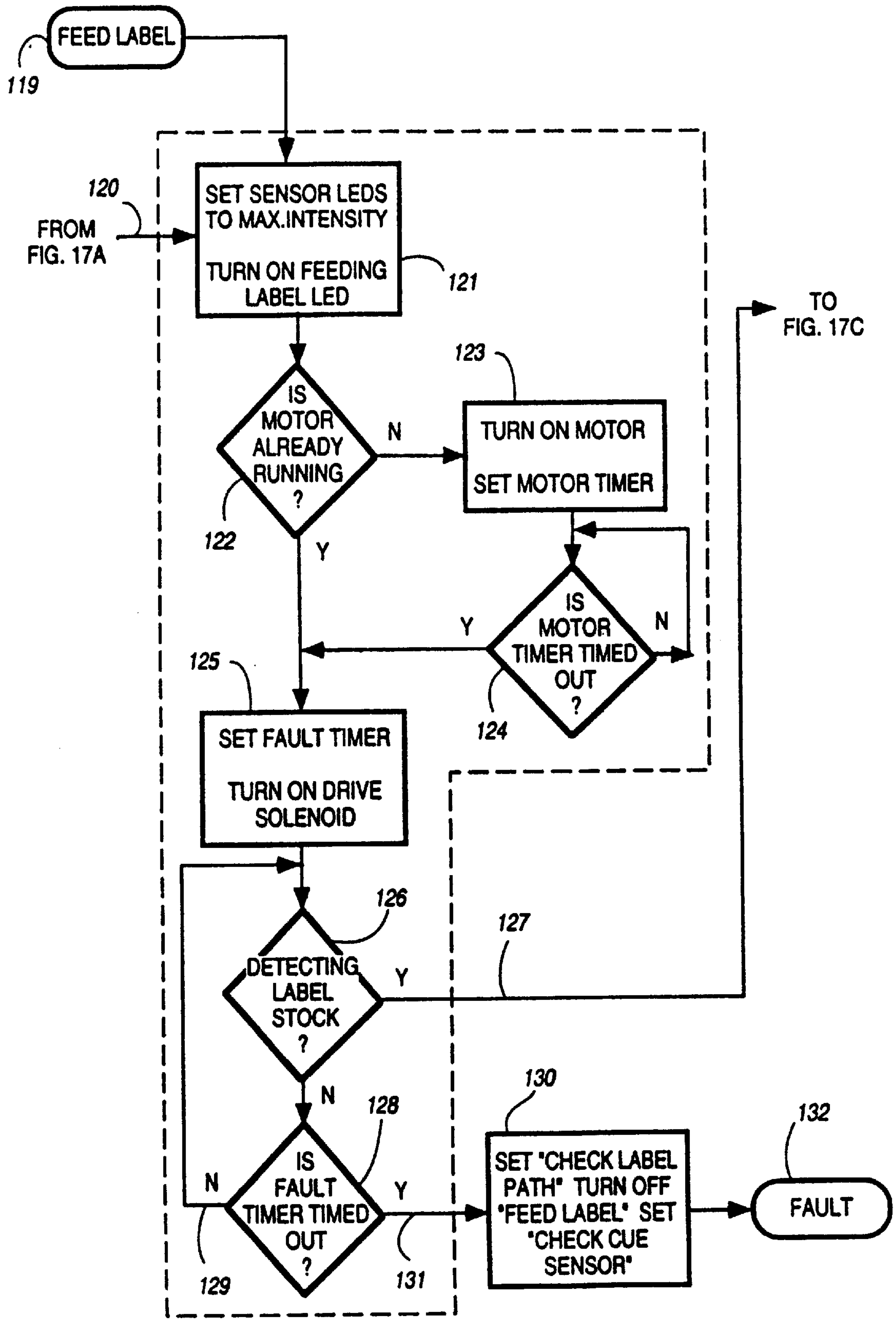
Figure 17C:
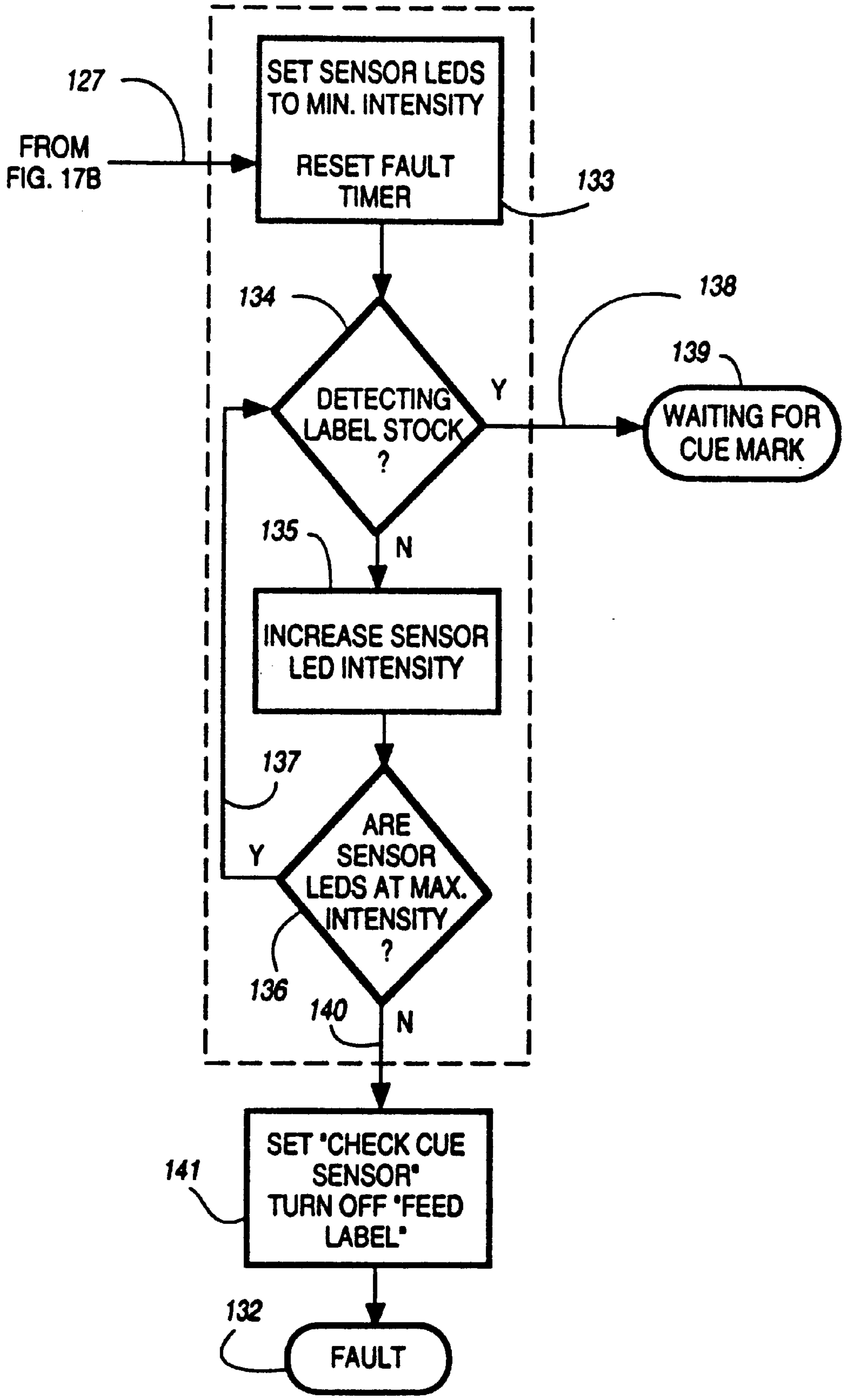

FIG. 17 shows several sections of the software including at the extreme left at FIG. 17A the START UP ROUTINE, in the middle, the LABEL STOCK INITIAL FEED and at the right at FIG. 17C, the CUE MARK SENSOR CALIBRATION. Now going through the details of each one of these, we first with FIG. 17A.

Start-Up Routine

Figure 19:
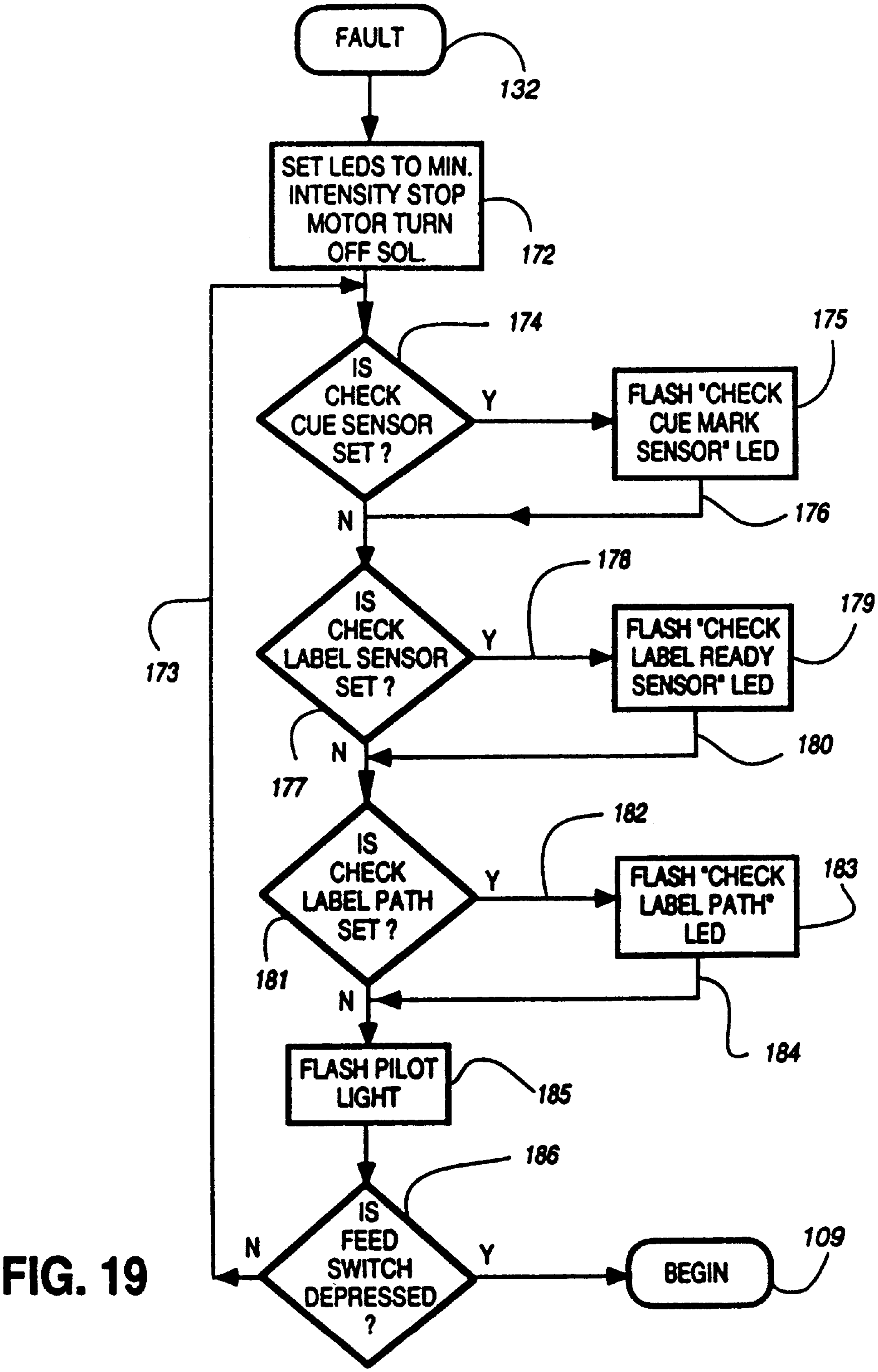
FIG. 19 is a yet further logical flow diagram of the inventive software.

Starting at the extreme top of FIG. 17A, the numeral 108 designates a box corresponding to microcontroller reset which occurs upon initial application of power. The numeral 109 is a box designating a reentry point of the system and corresponds to the termination of FIG. 19 wherein the fault routine has completed its execution. The box at the bottom of FIG. 19 is also designated 109.

Next in line in FIG. 17A is the block 110 which corresponds to initializing the system and this occurs irrespective of whether the system is starting up under the reset mode 108 or under the reentry mode 109. Once the system is initialized, the next step is to check whether the mode switch 55 is set to AUTO and this is designated by the decision block 111. If the response is "no", viz., "N" as illustrated then there is a further check via decision block 112 which checks to see whether the feed label switch 56 is closed. If the response again is "no", the loop 113 is pursued until one or the other of the switches is actuated. Irrespective of which decision block 111 or 112 is actuated as indicated by the "Y" symbol, an output is delivered to line 114 which goes to a decision block 115 to determine whether there is a label present or not. If one is present, the label ready light 98 is illuminated by the block 116. Until the label 34 is removed, the system remains in this state proceeding around the loop 117. Once the label is removed, the label ready light 98 is turned off by the box 118—and the explanation of the system now proceeds to the central part of FIG. 17, viz., FIG. 17B.

Label Stock Initial Feed

Figure 18:
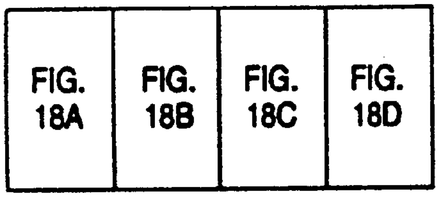
FIG. 18 is a further flow diagram of software and consisting of interconnected portions 18A, 18B, 18C and 18D.
Figure 18A:
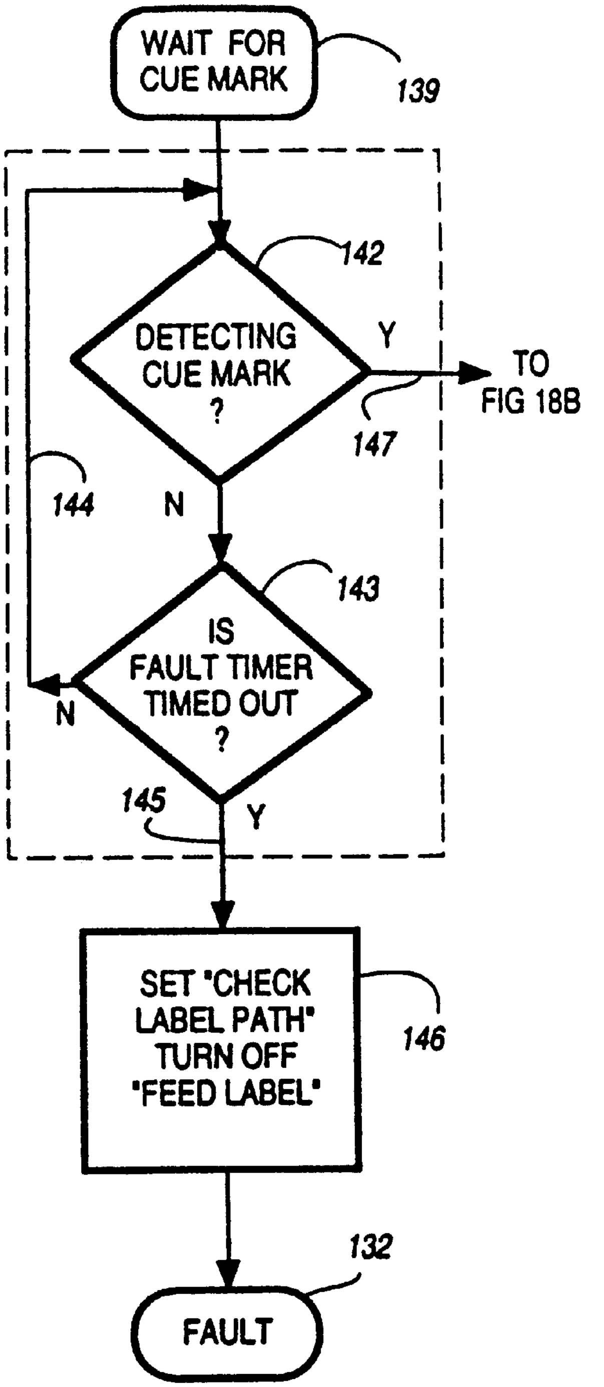
Figure 18B:
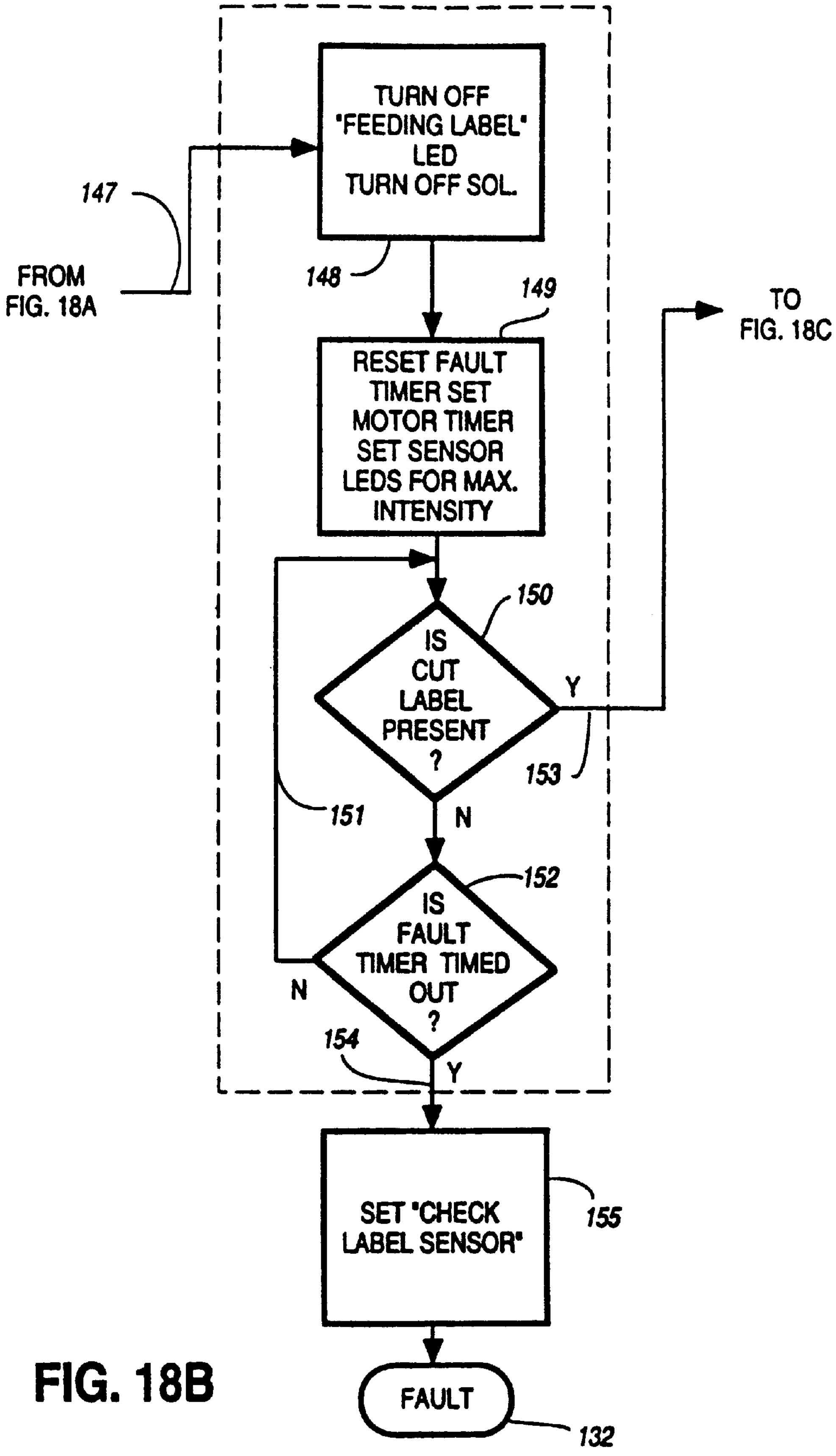
Figure 18C:
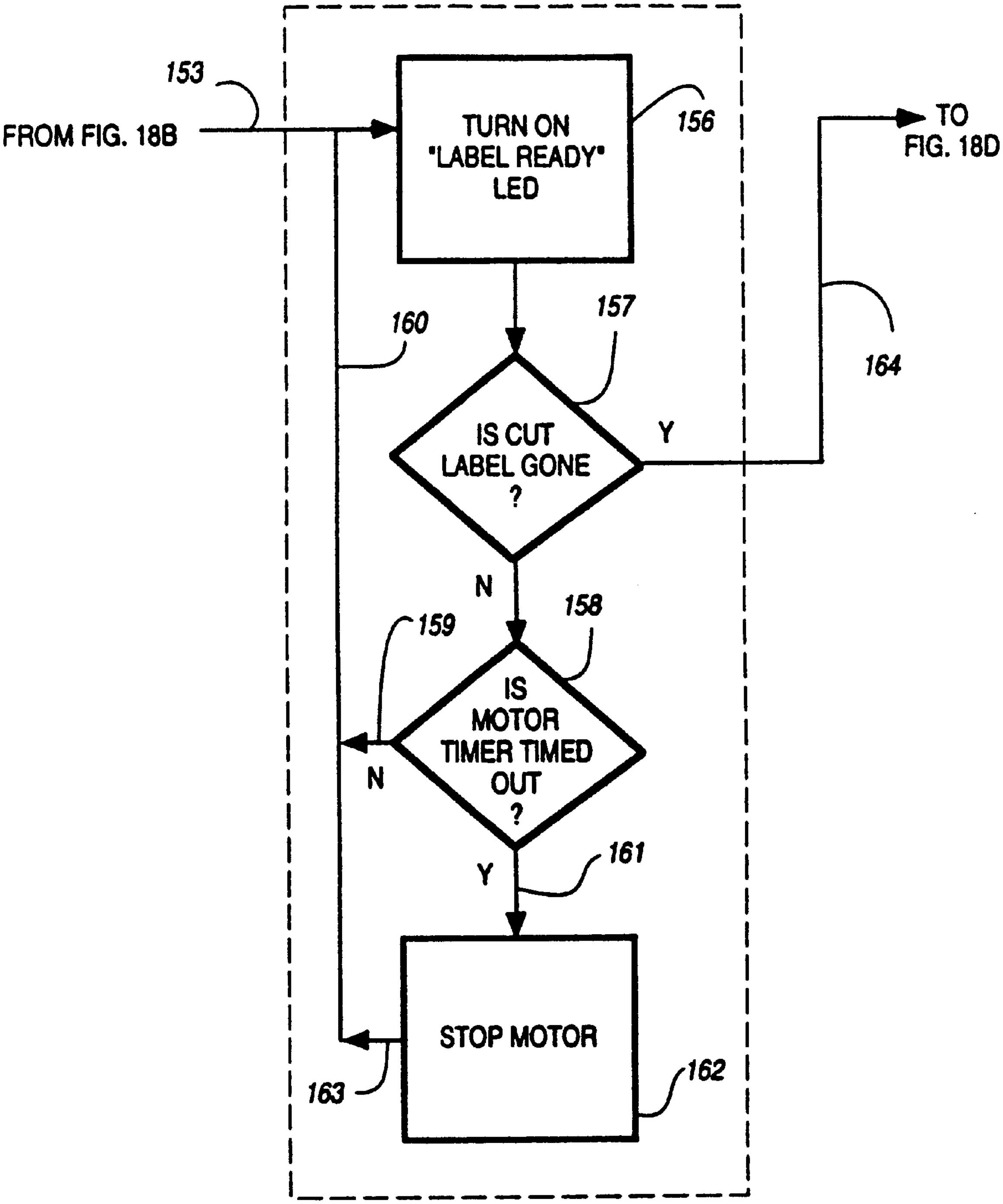
Figure 18D:
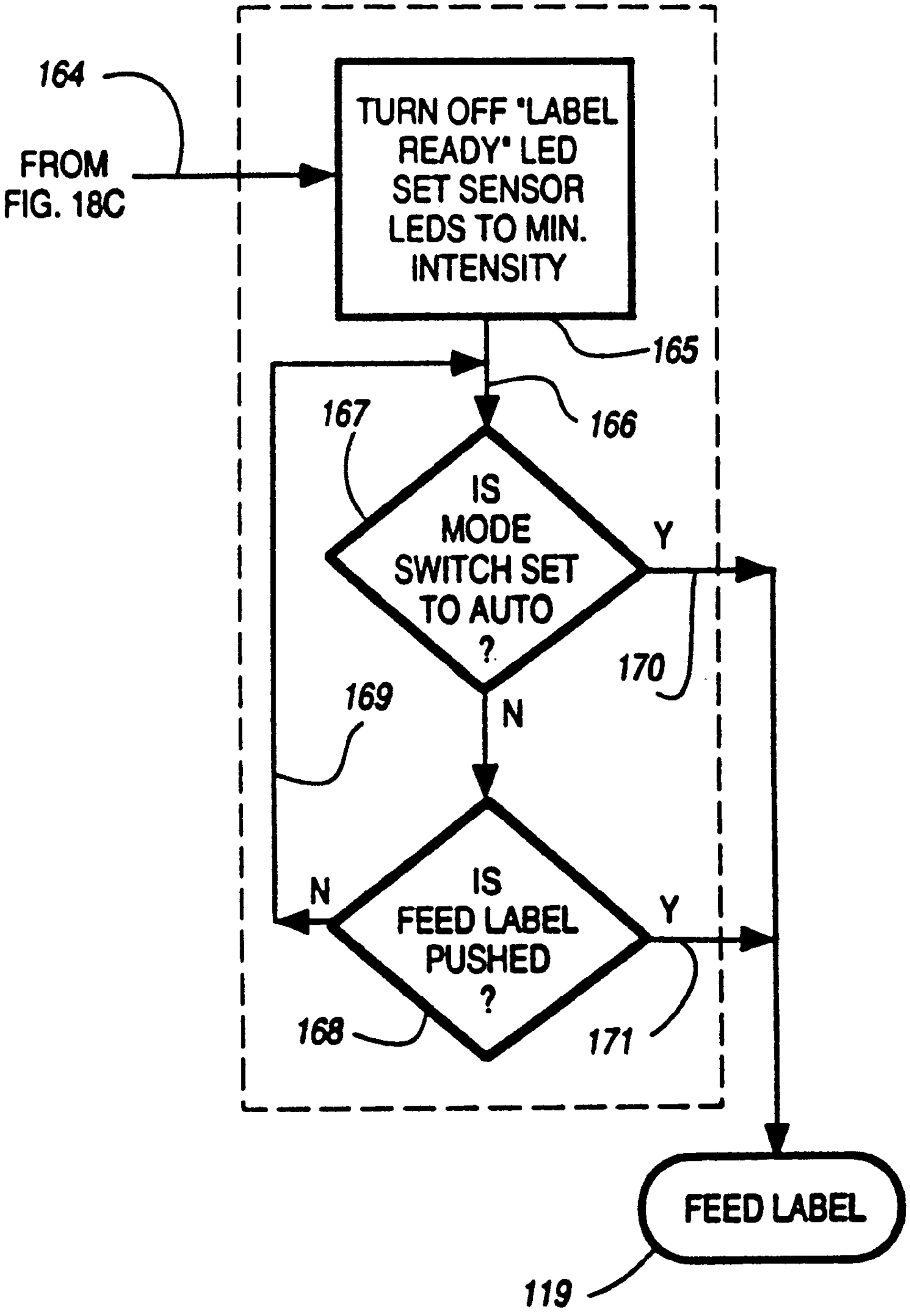

A point of entry is at 119 which can be seen also at the extreme lower right of FIG. 18D. Alternatively, the entry is via line 120 from box 118 of FIG. 17A and this enters FIG. 17B at box 121. There the sensor LED driver 93 (see FIG. 15) is set to full power and light 97 (also see FIG. 15 at the extreme left) is turned on. The decision block 122 is directed to whether the motor 72 is already running. If is not, then the microcontroller 87 turns on the motor driver 89 as indicated by block 123 which also sets the motor timer in operation.

The software timer 124 allows the motor 72 to come to full speed before turning on the solenoid driver 90 which energizes the drive solenoid 67—this being represented by block 125. Also, the block 125 sets a fault timer. Next in the system is the decision block 126 which determines whether the cue sensor 78 has detected the leading edge of the label stock as being driven by the drive motor 72 and the drive solenoid 67. Once the detection occurs in decision block 126, we proceed via line 127 to the cue mark sensor calibration which is to be described hereinafter relative to the portion of FIG. 17 at the extreme right, viz., FIG. 17C.

Before that, however, if the decision block 126 does not have the cue sensor detecting the forward edge of the label stock and the fault timer is not timed out as indicated by the decision block 128, the system remains in the loop 129. However, if the fault timer in decision block 128 is timed out, the system then proceeds to block 130 by line 131 which turns on light 99 to check the label path, light 97 is turned off so that there is no indication for feeding the label and light 100 is turned on to check the cue mark sensor. This results in proceeding to block 132 which is an entry point on FIG. 19 at the upper portion and which is also designated 132.

Cue Mark Sensor Calibration

Proceeding now along line 127, the next incident in the system is represented by the box 133 at which time the sensor LED driver 93 is set to minimum intensity. Also the fault timer is reset.

At this stage, the system is awaiting the detection of the label stock as indicated by the decision block 134. When this does not occur, the system then results in activity in the block 135 which is an increase in the intensity of the sensor LED driver 93. This then is followed by the decision block 136 which inquires whether the sensor LED driver 93 is at maximum intensity. If it is not, the loop 137 is followed until the maximum intensity is reached or the decision block 134 detect the label stock and then via line 138 is in the condition of the box 139 of waiting for the cue mark. In such as case, the next activity is found in FIG. 18 and more particularly, FIG. 18A.

If, however, the sensor LED driver 93 is at maximum intensity, then we proceed via line 140 to block 141 which corresponds to turning on light 100 indicating the need to check the cue mark sensor and also the turning off of the light 97 corresponding to feeding the label. When the system is in the block 141, the next step is to proceed to box 132 which again is found at the top of FIG. 19. Generally, this could mean that the cue sensor is failing to operate in its preferred mode as having dust thereon or other problems.

In summary relative to FIG. 17C, the calibration is represented by the loop 137 where if the label stock is not detected by the decision box 134, the intensity of the sensor LED is increased at 135 and this continues around the loop 137 until a label stock is detected at 134 at which time the system then is waiting for the cue mark as indicated by the box 139.

Reference is now made to FIG. 18 which again is made up of a number of sections. The first section FIG. 18A is seen at the extreme left of FIG. 18 and will now be described.

Waiting for the Cue Mark

Referring now to the upper left hand portion of FIG. 18A, we again see the numeral 139 representing a box corresponding to waiting for the cue mark. The system then proceeds to decision box 142 which has to do with whether the cue mark represented by band 36 has been detected.

If the cue mark has not been detected, the system then proceeds to the decision block 143 to determine whether the fault timer is timed out. If the fault timer is not timed out in the decision block 143, the system proceeds around the loop 144 until a cue mark in the form of band 36 is detected. However, if the fault timer is timed out, the system proceeds along the path 145 to the box 146 which represents turning on light 99 requiring a check of the label path and turning off light 97 relative to feeding label. Then the system proceeds to a fault determination as represented by box 132 again—referring to the top of FIG. 19.

When a cue mark is detected in the decision block 142, we proceed along path 147 to the left central portion of FIG. 18, i.e., FIG. 18B.

Cut Label and Verify Function of Label Ready Sensor

The path 147 leads into box 148 wherein the light 97 is turned off and also the solenoid driver 90 is turned off. At this time the armature 71 of the drive solenoid 67 is released so that the springs 69 are permitted to contract and pivot the arm assembly 64 clockwise—to effect cutting and removal of nip roller 43 from nip engagement with driven feed roller 44. Next, block 149 resets the fault timer, sets the motor timer and applies maximum power to the sensor LED driver 93. This results in this power being applied to the sensors 78 and 49. Next there is a determination whether the cut label is present as indicated by the decision block 150. If it is not, the loop 151 is followed wherein the first check is at decision block 152 as to whether the fault timer is timed out. If it is not, then the loop 151 is executed to determine whether the label ready sensor 49 has determined whether the cut label is present as indicated by decision box 150. Once it has, the system proceeds along path 153 to a further stage.

However, before that, the lower portion of FIG. 18B requires an explanation of when the fault timer is timed out as indicated by decision box 152. Thereupon, the system proceeds along a path 154 to the box 155 which corresponds to lighting light 101 is to check the label ready sensor. Thereafter the system goes to box 132 which, as explained previously is at the top of FIG. 19.

Now returning to the system proceeding along path 153, the center right portion of FIG. 18 will now be explained in conjunction with FIG. 18C.

Waiting for Cut Label to Be Removed

The path 153 leads the system into box 156 wherein the system turns on the light 98 corresponding to "label ready". Thereupon, the system goes into a loop the beginning of which is illustrated by the decision block 157 which inquires whether the cut label has been removed. If it is gone, the system then proceeds to the portion of FIG. 18 at the extreme right, i.e., FIG. 18D.

If, however, the cut label is not gone, the system proceeds to the decision box 158 wherein the question is asked whether the motor timer is timed out. If it is not, the system then proceeds along line 159 to the upper portion of the loop designated 160 returning to block 156.

When, however, the motor timer is timed out, the system proceeds along line 161 to the block 162 which stops the motor via taking power from motor driver 88 to stop the motor 72. The system then proceeds along loop portion 163 which merges into upper loop portion 160 and again conditioning the system as indicated by the block 156.

Then when the cut label is gone, FIG. 18D is followed.

Get Ready to Feed Next Label

The line 164 connects the decision block 157 to the block 165 wherein the light 98 is turned off corresponding to "label ready" and the sensor LED driver 93 is again set to minimum intensity.

Now proceeding along path 166 to decision block 167, the decision has to be made about whether the mode switch is set to AUTO or not. If not, the decision block 168 applies and this inquires whether the feed label switch is pushed. If not, the system proceeds around the loop 169 until one of these two conditions is true. Whenever either of these conditions apply, the result is communicated via line 170 from decision block 167 or 171 from decision 168 to the label feed block 119 which is in the upper left central part of FIG. 17. The foregoing description of FIGS. 17 and 18 illustrates the basic operation of the software-containing microcontroller 87. FIG. 19 deals with faults and the procedures for correcting the same.

Fault Routine

Starting at the extreme top of FIG. 19 the numeral 132 indicates a box representing a fault which has been reported from the system of FIGS. 17B or C or FIGS. 18A or B.

Once this occurs, the system moves into the block 172 which sets the sensor LED driver 93 to minimum intensity, turns off the motor driver 89 and turns off the solenoid driver 90. The system then enters a loop designated 173 the first part of which is a decision box 174. There it is asked whether the check cue sensor is set and if so, light 100 is lit or flashing. If it is, there should be checking of the cue mark sensor LED as indicated by box 175. If there is a fault in the cue mark sensor and its circuit, the light 100 will flash. Meanwhile the system continues checking via path 176 to check the setting of the label ready sensor as indicated by box 177. If it is set, then via path 178 the light 101 is flashed as indicated by box 179. Thereupon we return via path 180 to the decision block 181 to check whether the label path is set, i.e., whether the light 99 is on. If the check label path is set as by the illumination of light 99, we proceed via path 182 to box 183 which results in the flashing of light 99. After that, we return via path 184 to box 185 which results in the flashing of the pilot light 58. This is indicative of the system having a fault but not specific to any particular portion of the system.

In the illustration just given, there could be a maximum of three faults as represented by flashing occurring as a result of the boxes 175, 179 and 183 relating respectively to lamps 100, 101 and 99. Thereafter the decision box 186 is reached which requires depression of the feed switch 56. Then, if all of the faults are corrected, the system is ready for operation resumption as indicated by the box 109 at the bottom of FIG. 19 and also at the beginning of FIG. 17A. If not, the loop 173 is followed again.

SUMMARY OF INVENTION

A first aspect of the invention is a linerless label product 30 which includes a convolutely wound, elongated web W of predetermined width for feeding through a dispenser 40—see FIGS. 1 and 2. The first of the web faces is coated with pressure sensitive adhesive while the second is coated with release material. The pressure sensitive adhesive is interrupted at longitudinally spaced locations or areas 35 to provide transversely extending bands free of pressure sensitive adhesive. Associated with the bands 35 are signal-stimulating means 36. The area of the web second face between each pair of adjacent bands on the first face includes a label 31 which may be defined by printed indicia 32. These are in positions between the band locations but on the other side of the web. The signal-stimulating means 36 is detectable by sensing during the feeding of the web so as to actuate severing means to transversely sever the web in the bands for application by hand H to a surface 39.

The adhesive coating need not extend the full width, terminating short of the edges as at 37, for example—so the first face is coated at least partly with adhesive. Correspondingly, the second face is coated with release material at least in the parts corresponding to the adhesive coat.

Advantageously, the signal stimulating means is of non-reflective character—such as a black or green cue mark—which may be in the transverse bands on the first face. The positions of the web first face between the bands is more reflective, as having a light or white cast. The invention also contemplates the signal-stimulating means 36 being separate from the bands as would be the case with cue marks underlying one of the Roman numerals in each label 31 in FIG. 1.

The bands 35 may be equally longitudinally spaced along the length of the web W to provide a series, for example of identical labels. However, if each device 39 is to have several labels affixed thereto—of different size, then the longitudinal spacing may be different for the adjacent labels, viz., the spacing between bands varies between adjacent bands.

A second aspect of the invention includes a method of making a linerless label which includes the steps of advancing an elongated paper web along a predetermined path, applying signal-stimulating means to one face of the web at longitudinally spaced locations, the other face of the web being adapted to be equipped with informational indicia in longitudinally spaced positions, applying a release material to the other face of the web, and applying pressure sensitive adhesive to the web on the one face thereof at least aligned with the positions and providing skipped transversely extending bands free of adhesive, the area of application of said release material corresponding at least to the area of application of the adhesive.

In the illustration given, the signal-stimulating means 36 are applied in the locations of the bands 35 on one side of the web while the labels, i.e., the informational indicia is provided on the other side in positions between the band locations. But where the informational indicia is of a type other than the alpha, numeric and/or graphics shapes, viz., heat activateable or self-contained material, the material can extend the entire length of the web if economics dictate but with only the positions between bands (and on the opposite side thereto) being used for presenting the informational indicia.

In the general case, a single press is used for the INDICIA APPLICATION as seen in FIG. 14. Here the term indicia refers not only to the informational indicia 32 but also to the cue mark means 36 which can be considered a form of indicia although its function is signal-stimulating versus information communication.

Also, as seen in FIG. 14, the web starts as a roll, i.e., UNWIND PAPER, and finishes as a roll, i.e., REWIND.

A third aspect of the invention broadly includes a method for dispensing linerless, pre-printed labels which include the steps of providing an elongated web W of linerless labels 31 arranged in spaced longitudinal series and in which the web is equipped with longitudinally spaced signal-stimulating means 36 for each label. We advance the web along a path P parallel to its longitudinal axis past web severing means 47, detect each indicia and responsive to said detection transversely severing the web between labels, and applying said labels to an object 39. More particularly, the convolutely wound web roll 30 is installed in a dispensing housing providing a predetermined path, advancing the web in the path, sensing the signal-stimulating means and delivering an actuating signal to cutting means in said path which actuate the cutting means to transversely sever the web in the bands for dispensing through the outlet.

The method includes providing a sensor for sensing each label, calibrating each sensor as a result of said sensing and thereafter sensing each band and thereafter recalibrating the sensors based upon the sensing successor label. After this is done, the cutting can be performed—with the advance of the web being stopped during cutting. Even further, the method steps include sensing the presence of a previously severed label and if the same is present in said path, inhibiting or delaying further severing until the previously severed label is removed from the path.

Because of the AUTO/MANUAL alternatives to operation the method provides steps which include automatically advancing and severing the web upon the removal of a previously severed label, or in which manual actuation of the advancing and severing means must be performed after a previously severed label has been removed from sensing position.

A fourth aspect of the invention includes apparatus for dispensing linerless pre-printed labels equipped with indicia for each label. The apparatus includes a housing 40 providing a roll holding chamber 41 and a web outlet 45. A path P connects the chamber with the outlet. There are draw roller means 43, 44 adjacent the chamber in the path. There are means 78, 49 in the path for sensing the cue mark and for delivering an actuating signal in response to the sensing. There are web cutting means 47 in the path between the draw roller means and the outlet and responsive to the actuating signal, and there are guide means 50 in the path between the cutting means and the outlet. The housing includes means for sensing a severed label in the guide means 50 and for delivering an inhibiting signal to the severing means 47 when a label is sensed in the guide means.

But when the guide means 50 is free of any label 31—as reported by the sensor 49—the knife mechanism 47 can operate. The sensor 49, in the absence of a label in the holder or guide means 50 looks through the opening 107 and thus receives no reflected signal or at least one of minimal magnitude, so there is no inhibiting of the operation of the knife mechanism 47. In what can be considered reverse fashion, if the sensor 78 can see through its aligned opening 106, nothing happens because this indicates the absence of the web—hence there is nothing to be cut.

Then when cutting occurs, the hold-down means 76 operates to prevent retraction of the web—as discussed previously.

The apparatus includes electronics under the control of the microcontroller 87—see FIG. 15. This is operably associated with the sensors 78, 49 which are adapted to detect differences between each label and an adjacent band and to activate the cutting means 47 when a predetermined difference is sensed. The program of the microcontroller receives a report on the sensing of each label, calibrates the sensing means as a result of the label sensing, thereafter senses a band adjacent the sensed label to actuate the cutting means 47, and thereafter recalibrates the sensing means based upon sensing a successor label. As explained previously, this insures that no false signal will be given the cutting means 47 because each sequence starts, in effect, from the beginning.

An incident to this "restarting" a whole series of potential "faults" are checked or monitored—as by selectively actuating one or more of the lights 58 and 95–101 each corresponding to a specific fault.

While in the foregoing specification a detailed description of the embodiment of the invention has been set down for the purpose of illustrating the invention, many variations in the details hereingiven may be made to those skilled in the art without departing from the spirit and scope of the invention.

We claim:

1. A linerless label product comprising a convolutely wound, elongated web of predetermined width for feeding through a dispenser, said web having first and second faces, one of said faces being at least partly coated with pressure sensitive adhesive while the other face is coated with release material at least in the parts corresponding to the adhesive coat, the pressure sensitive adhesive on said one face being interrupted at longitudinally spaced areas to provide transversely extending bands free of pressure sensitive adhesive, signal-stimulating means operably associated with said bands, and the area of said web other face between each pair of adjacent bands being equipped with informational indicia, said signal-stimulating means being detectable by sensing during the feeding of said web for actuating severing means to transversely sever said web in said bands.

2. The product of claim 1 in which said signal stimulating means includes a non-reflective material in said bands, said labels being equipped with reflective material to effect sensing by reflectivity changes.

3. The product of claim 2 in which the background of said labels is relatively light while the background of said bands is relatively dark.

4. The product of claim 3 in which the background of said bands is black.

5. The product of claim 2 in which the background of said labels is relatively dark while the background of said bands is relatively light.

6. The product of claim 1 in which said informational indicia is a member selected from the group of alpha shapes, numeric shapes, graphic shapes, thermally-activated material, and self-contained material.

7. The product of claim 1 in which said signal-stimulating indicia are not coextensive with said bands.

8. The product of claim 1 in which said signal-stimulating means are separate from said bands.

9. The product of claim 1 in which said adhesive is not coextensive with the width of said web.

10. The product of claim 1 in which said bands extend the width of said web.

11. The product of claim 1 in which each of said bands has a dimension in the direction of the length of said web of the order of about ⅛" to about ½" and the labels have a dimension in the direction of web length of at least about 1½".

12. The product of claim 1 in which said bands are equally longitudinally spaced along the length of said web.

13. The product of claim 1 in which the spacing between said bands varies between adjacent bands.

14. The product of claim 1 in which said web has a paperboard core of diameter only dependent on the size of the winding mandrel.

15. The product of claim 1 in which said informational indicia is printed.

16. The product of claim 15 in which said printed indicia is one or more of fixed information, variable information, and both fixed and variable information.

17. The product of claim 15 in which said printed indicia includes alpha and/or numeric information.

18. The product of claim 15 in which said printed indicia includes fixed and/or variable information.

19. A linerless label product comprising a convolutely wound, elongated web of predetermined width for feeding through a dispenser, said web having first and second faces each having a light background, a dark label information print on said second face in longitudinally spaced positions, dark signal stimulating print on said first face in longitudinally spaced locations between said positions, said first face being at least partly coated with pressure sensitive adhesive while said second face is coated with release material at least in the parts corresponding to the adhesive coat, the pressure sensitive adhesive being interrupted at said locations to transversely extending bands free of pressure sensitive adhesive with said signal-stimulating print being located in said bands, said signal-stimulating print being detectable by sensing during the feeding of said web for actuating severing means to transversely sever said web in said bands.

20. A linerless label product including a rolled web having a first face coated with pressure sensitive adhesive and the second coated with release material, the second face including spaced labels under said release material, the first face having bands free of adhesive between the spaced labels and signal-stimulating means operably associated with said bands, the product being made by printing said labels on said second face and said signal-stimulating means on said first face while said web is being advanced in a predetermined path, coating said second web face with release material and thereafter coating said first web face with pressure sensitive adhesive, and winding said web into a convolutely wound roll.

* * * * *